(12) United States Patent
Ruopp et al.

(10) Patent No.: US 11,453,459 B2
(45) Date of Patent: Sep. 27, 2022

(54) BRAKING SYSTEM WITH PARKING BRAKE DEVICE

(71) Applicant: Gustav Magenwirth GmbH & Co. KG, Bad Urach (DE)

(72) Inventors: Michael Ruopp, Berghuelen (DE); Axel Wechsler, Roemerstein (DE); Christian Neutsch, Reutlingen (DE); Philipp Roesing, Neuhausen (DE)

(73) Assignee: Gustav Magenwirth GmbH & Co. KG, Bad Urach (DE)

( * ) Notice: Subject to any disclaimer, the term of this patent is extended or adjusted under 35 U.S.C. 154(b) by 0 days.

(21) Appl. No.: 16/918,193

(22) Filed: Jul. 1, 2020

(65) Prior Publication Data
US 2021/0001952 A1    Jan. 7, 2021

(30) Foreign Application Priority Data
Jul. 3, 2019   (DE) .......................... 102019117929.7

(51) Int. Cl.
| | |
|---|---|
| *B62L 3/06* | (2006.01) |
| *B62L 1/00* | (2006.01) |
| *B62L 3/02* | (2006.01) |
| *B62L 5/00* | (2006.01) |
| *B62L 5/20* | (2006.01) |

(52) U.S. Cl.
CPC ................. *B62L 3/06* (2013.01); *B62L 1/005* (2013.01); *B62L 3/023* (2013.01); *B62L 5/006* (2013.01); *B62L 5/20* (2013.01); *B60Y 2200/13* (2013.01)

(58) Field of Classification Search
CPC ................... F16D 55/225; F16D 65/18; F16D 2055/0008; F16D 2121/06; F16D 2121/14; F16D 2125/06; B62L 1/005; B62L 5/20; B60T 13/22; B60Y 2200/13
USPC ......................................................... 188/344
See application file for complete search history.

(56) References Cited

U.S. PATENT DOCUMENTS

| | | | | | |
|---|---|---|---|---|---|
| 3,035,871 | A | * | 5/1962 | Giampapa ............... | F16D 65/18 188/351 |
| 3,613,839 | A | * | 10/1971 | MacDuff ............... | F16D 65/567 188/170 |
| 3,893,549 | A | * | 7/1975 | Bennett ................... | F16D 65/18 188/170 |
| 5,111,915 | A | * | 5/1992 | Rupprecht ............ | F16D 55/227 188/71.1 |
| 5,358,078 | A | * | 10/1994 | Gajek ...................... | B62L 1/00 188/26 |

(Continued)

FOREIGN PATENT DOCUMENTS

| | | |
|---|---|---|
| CN | 2150140 Y | 12/1993 |
| CN | 2825443 Y | 10/2006 |

(Continued)

*Primary Examiner* — Robert A. Siconolfi
*Assistant Examiner* — San M Aung
(74) *Attorney, Agent, or Firm* — Reinhart Boerner Van Deuren P.C.

(57) ABSTRACT

A braking system is proposed for a vehicle, in particular a lightweight vehicle, in particular a pedal cycle, comprising a brake device, a mechanical urging device, and a hydraulic urging device, wherein the mechanical urging device and the brake device form a parking brake device, and the hydraulic urging device takes the form of a hydraulically actuable release device for the parking brake device.

38 Claims, 13 Drawing Sheets

(56) References Cited

U.S. PATENT DOCUMENTS

| | | | | |
|---|---|---|---|---|
| 5,904,228 A | * | 5/1999 | Eike | F15B 13/044 |
| | | | | 188/170 |
| 7,695,074 B2 | | 4/2010 | Pongo | |
| 2002/0185349 A1 | * | 12/2002 | Jakovljevic | B62L 3/08 |
| | | | | 188/344 |
| 2009/0293715 A1 | * | 12/2009 | Moore | F16D 65/18 |
| | | | | 92/163 |
| 2012/0261219 A1 | * | 10/2012 | Nakakura | F16D 65/50 |
| | | | | 188/72.1 |
| 2017/0335909 A1 | * | 11/2017 | Dennis | F16D 55/36 |
| 2017/0369120 A1 | * | 12/2017 | Huang | B62L 3/02 |

FOREIGN PATENT DOCUMENTS

| | | | | |
|---|---|---|---|---|
| CN | 201136496 Y | | 10/2008 | |
| CN | 105197167 A | | 12/2015 | |
| DE | 195 00 556 A1 | | 3/1996 | |
| DE | 298 11 255 U1 | | 9/1998 | |
| DE | 10 2013 217 106 A1 | | 3/2015 | |
| DE | 102015012016 | * | 3/2017 | |
| DE | 102015012016 A1 | * | 3/2017 | |
| DE | 10 2016 211 015 A1 | | 12/2017 | |
| DE | 10 2016 223 734 A1 | | 5/2018 | |
| DE | 102017202019 | * | 8/2018 | |
| DE | 102017202019 A1 | * | 8/2018 | B60T 11/224 |
| EP | 269547 A2 | * | 6/1988 | |

\* cited by examiner

XI-XI

BRAKING SYSTEM WITH PARKING BRAKE DEVICE

This patent application claims the benefit of German application No. 10 2019 117 929.7 filed Jul. 3, 2019, the teachings and disclosures of which are hereby incorporated in their entirety by reference thereto and for all purposes.

BACKGROUND OF THE INVENTION

The invention relates to a braking system for a vehicle, in particular a braking system for a lightweight vehicle that is drivable in particular by a motor, in particular an electric motor and/or at least also by means of the muscle power of a person riding it, such as a pedal cycle and/or a pedelec and/or an e-bike. In particular, the braking system is provided for a lightweight carrier vehicle—that is to say for example a carrier cycle and/or a carrier pedelec and/or a carrier e-vehicle, with or without pedals.

The object of the invention is to improve a braking system of this kind, in particular to provide enhanced safety by means of the improved braking system for the vehicle.

SUMMARY OF THE INVENTION

According to the invention, this object is achieved by a braking system of the type mentioned in the introduction in that this braking system comprises a brake device, a mechanical urging device, and a hydraulic urging device, wherein the mechanical urging device and the brake device form a parking brake device, and the hydraulic urging device takes the form of a hydraulically actuable release device for the parking brake device.

It is thus also provided for the braking system to comprise a parking brake device that has a mechanical urging device for the brake device thereof and a hydraulically actuable release device.

One advantage of this solution can be seen for example in the fact that the parking brake device improves the braking system, and in particular meets greater safety requirements that are made for example of persons riding the vehicle, in that by means of the parking brake device a parked vehicle can be secured for example to prevent it from rolling away in an undesired manner. In this case, it is particularly favorable that the brake device of the parking brake device is urged by the mechanical urging device, since mechanical urging provides a reliable method of urging that is not susceptible to failure.

In particular, one advantage of this solution can be seen in the fact that the release device of the parking brake device is hydraulically actuable by the hydraulic urging device, and thus the parking brake device can be released in a simple manner and, particularly advantageously, is configured to be combined and/or constructed using known hydraulic systems.

In particular, it is provided for the braking system to have at least one braking condition in which the parking brake device performs braking, that is to say in particular the brake device thereof acts to brake the vehicle, in particular a wheel thereof. Preferably here, in the context of the parking brake device the term "acting to perform braking" should be understood to mean that it substantially prevents a rotary movement of the wheel of the vehicle that is necessary for the vehicle to move along. In this way, it is thus in particular provided for the parking brake device to be put into the braking condition when the vehicle is at a standstill, in particular being parked, in order in this way to prevent an acceleration of the vehicle to a speed that is not equal to or is greater than zero.

Preferably, the braking condition is thus provided in order to keep the vehicle at a standstill.

Moreover, it is in particular provided for the braking system to have at least one release condition, in which the parking brake device is inactive. Here, the term "inactive parking brake device" should be understood in particular to mean that the parking brake device does not act to brake the vehicle, in particular the wheel thereof, but substantially permits a rotary movement of the wheel that is necessary for the vehicle to move along.

Here, it is advantageously provided for the mechanical urging device to be formed and arranged in relation to the brake device such that urging by the mechanical urging device puts the brake device into the braking condition. In this way, the permitted mechanical mode of urging is thus in particular used by means of the mechanical urging device to put the brake device into the braking condition.

Preferably, it is provided for the hydraulic urging device to be formed and arranged in relation to the brake device such that urging by the hydraulic urging device puts the brake device into the release condition. In this way, it is thus provided in particular that when the brake device is urged by the hydraulic urging device the brake device is put into the release condition, and thus for example the favorable properties associated with operation of a hydraulic actuation for release of the brake device are exploited.

More detailed statements have not yet been made as regards the form taken by the brake device.

It is favorable if the brake device comprises two brake shoe units. In particular, the two brake shoe units—in particular brake pads thereof—are arranged to be movable in relation to one another. In particular, this allows a structurally simple brake device to be produced, in particular as a disk brake.

Here, it is in particular provided for the two brake shoe units to act to perform braking in the braking condition. Preferably, it is provided for the brake device also to comprise a brake ring that is arranged and/or configured to be arranged on a wheel of the vehicle, in particular on a hub of the wheel. Preferably, it is provided in this case for the two brake shoe units to cooperate with the brake ring to perform braking in the braking condition and in particular for a relative movement of the brake ring in relation to the brake shoe units to be substantially prevented. In particular, in the braking condition the brake ring is acted upon by the two brake shoe units, for example being pressed between them.

In particular, it is provided for the two brake shoe units to define between them a brake receiving space. Preferably, in this case the brake receiving space is provided for receiving at least one portion of the brake ring. In particular, the brake receiving space is smaller in the braking condition than in the release condition. In this way, it is thus favorably provided for the brake ring to be configured to be arranged such that one portion extends through the brake receiving space. In particular, free rotation of the brake ring is substantially made possible in the release condition by the brake shoe units—as a result of the brake receiving space being made sufficiently large—and prevented in the braking condition—as a result of the brake receiving space becoming smaller. In particular, the brake ring is prevented from rotating in that the two brake shoe units act to brake the portion of the brake ring that is arranged in the brake receiving space, and in particular keep this portion immobilized in the brake receiving space, with the result that the brake ring is thus forced to keep substantially still and so the wheel is substantially forced to keep still.

In principle, it is possible for the brake device to be movable from one condition into another condition in the most diverse ways.

For example, in some embodiments it is provided for the brake device to be movable into another condition by means of cable pulls.

In particularly preferred embodiments, it is provided for the braking system, in particular the brake device, to comprise at least one urging piston. Here, in particular the urging piston is provided in order, for example by a movement thereof, to put the brake device into another condition. Here, it is particularly favorable if, when the urging piston is urged, it puts the brake device into another condition. Preferably, it is provided for the urging piston to take a form and to be arranged in order to put the brake device into the at least one braking condition and/or the at least one release condition in dependence on the orientation of an in particular opposing direction of urging.

In particular, by means of the urging piston there is provided a structurally simple and robust solution for putting the brake device into another condition.

For example, the urging piston could be arranged substantially freely, acting on the brake device, in particular on the brake shoe units.

Preferably, it is provided for the brake device to comprise a casing. In particular, the casing is provided in order to arrange the urging piston and further parts of the brake device therein. In this way, in particular these parts are protected from soiling and, for example, the casing also provides an at least partial protection from external mechanical influences that could damage the parts of the brake device.

In particular, the casing comprises a piston guide space in which the urging piston is arranged.

It is particularly favorable if the urging piston is arranged in the casing such that it is linearly movable relative thereto in a direction of urging. For example, the urging piston is arranged mounted in the casing such that it is guided linearly.

It is particularly favorable if the piston guide space has piston guide faces, and the urging piston is arranged along the piston guide faces and guided thereby such that it is movable in the casing. For example, the urging piston comprises a guide part that abuts against the piston guide faces by means of external guide faces.

In particular, as a result of the linear mounting of the urging piston, during linear movement thereof the piston guide faces and the external guide faces slide on one another. As a result of being guided along the piston guide faces, in particular a particularly favorable mounting and guidance of the urging piston in a linear direction is made possible.

For example, it is provided for the urging piston to be arranged to be movable, in particular linearly movable, over a travel range of at least 1 mm. In particular, a maximum travel over which the piston is arranged to be movable, in particular linearly movable, is at most 10 mm, in particular at most 5 mm. In particular, these dimensions are particularly favorable for lightweight vehicles, and with travels of such dimensions it is possible to provide the required urging forces and on the other hand, simple operation, in particular by the person riding the lightweight vehicle, is made possible, since the travel distances to be covered, for example when there is a master unit, are not too large.

Preferably, it is provided for at least one of the brake shoe units to be coupled to the urging piston to perform urging. For example, in this way, when the urging piston urges the at least one brake shoe unit, the coupling has the effect that the brake shoe unit preferably cooperates with the brake ring to perform braking. In particular, it is provided, at least in the braking condition, for at least one of the brake shoe units to be urged by the urging piston.

In some embodiments it is provided for the coupling between the urging piston and the at least one brake shoe unit to be made by way of a coupling arrangement. For example, one advantage thereof may be that, by means of the coupling arrangement, the action of the urging piston on the brake shoe unit may be varied in a desired manner; for example, a force may be controlled and/or intensified.

In other particularly favorable embodiments, it is provided for a brake pad of a brake shoe unit to be arranged on the urging piston. The effect of this direct arrangement is in particular that the coupling that performs urging is produced in a structurally simple manner, and in particular the direct arrangement makes the action of the urging piston on the brake shoe unit less susceptible to failure.

Preferably, in this context it is provided for the brake pad to be arranged on a front side of the urging piston.

For example, the brake pad is in this case attached to the urging piston by adhesion. In other embodiments, it is provided for the brake pad to be screwed to the urging piston.

In particularly preferred embodiments, it is provided for the brake pad to be arranged on the urging piston magnetically, for example being held thereon magnetically.

It is particularly favorable if the casing has an aperture through which the urging piston urges the at least one brake shoe unit. In particular, the aperture opens on the one hand into the piston guide space and on the other to an outside of the casing, and takes the form for example of an opening in a casing wall that delimits the piston guide space. The favorable aspect in this case is that the urging piston can be arranged to be movable in the casing and protected thereby, and can urge the brake shoe unit that is arranged on the outside through the aperture.

It is particularly advantageous if the urging piston passes, at least by means of an urging part, through the aperture in the casing, and projects out of the casing, and in so doing urges the at least one brake shoe unit in particular by means of the part projecting out of the aperture.

In preferred embodiments, it is further provided for a seal to be arranged in the aperture, for sealing off the piston guide space. In this way, preferably the piston guide space is sealed off from the outside in order to prevent hydraulic medium from escaping from the piston guide space and/or at least to reduce the ingress of moisture into the piston guide space.

In different embodiments, different arrangements of the urging piston and the brake shoe units are provided.

For example, in some embodiments a redirection device is provided that redirects urging of the urging piston in an urging direction onto the at least one brake shoe unit that is to be urged, wherein the brake shoe unit is arranged for example offset from the urging piston.

In particularly preferred embodiments, the urging piston and the two brake shoe units are arranged substantially along an axis of urging. In particular, the axial direction of the axis of urging corresponds to the urging direction of the urging piston, and the urging piston is mounted to be movable in this axial direction. This in particular enables particularly effective urging of the at least one brake shoe unit or the two brake shoe units, and preferably enables a structurally simple construction that is hence also less susceptible to failure. In particular in this case, the brake pads take a form that extends at least approximately perpendicular to the axis of urging, and preferably brake faces thereof extend at least approximately perpendicular to the axis of urging.

More detailed statements have not yet been made as regards the detailed form taken by the urging piston.

For example, in some embodiments the urging piston is a unit comprising a plurality of parts, in particular the urging part and the guide part, which are coupled to one another for the purpose of urging.

However, it is particularly advantageous if the urging piston substantially takes the form of a one-piece body, as a result of which in particular a robust construction thereof is made possible. In particular, in this case the urging part and the guide part are parts of the substantially one-piece body. In particular, the one-piece urging piston takes an elongate form along the axis of urging, and the urging part and the guide part are individual longitudinal portions thereof.

For example, there is arranged between the urging part and the guide part a connecting part that connects these parts. Preferably, in the case of the substantially one-piece urging part, the connecting part is a longitudinal portion of the one-piece body, extending between the guide part and the urging part.

In particular, a radial extent of the urging part is smaller than a radial extent of the guide part. This is provided in particular in the case of the one-piece urging piston, in which preferably individual longitudinal portions have different radial extents. For example, this makes it possible for the oblique faces and/or steps of the urging piston, which arise as a result of the differing radial extents, to be able to fulfill functions of the brake device. A radially relatively large guide part may also be advantageous for improved guidance of the urging piston.

In particular, a diameter of the urging piston that is made for example in one piece, this diameter being measured in particular at least approximately perpendicular to the axis of urging, is at least 6 mm, preferably at least 10 mm. Preferably, it is provided for the diameter to be at most 70 mm, in particular at most 50 mm. For example, in some embodiments it is provided for the diameter of the urging piston to be 20 mm±5 mm, at least in certain regions, and in other embodiments it is provided for it to be 30 mm±5 mm. In particular, these are dimensions favorable for urging devices for lightweight vehicles, wherein, using these dimensions, required urging forces can be transmitted, and on the other hand the piston is not too heavy for the lightweight vehicle and not too cumbersome, with the result that in particular actuation by a person riding the vehicle is made possible.

More detailed statements have not yet been made as regards different positions of the urging piston.

In particular, in the release condition the urging piston has a plurality of release positions, and also has for example a plurality of braking positions in the braking condition.

In particular, the urging piston is arranged to be movable in the release condition as far as a release end position and/or in the braking condition as far as a brake end position, and is movable into different positions, in particular between the release end position and the brake end position, wherein the different positions correspond in particular in part to the release condition and in part to the braking condition.

Preferably, the urging piston comprises a front axial abutment for the brake end position, with the result that in particular the urging piston is arranged to be movable as far as the brake end position, and in this position the front axial abutment cooperates with a mating piece. The mating piece could be a part arranged separately in the piston guide space, but it is particularly favorable if, in the brake end position, the front axial abutment cooperates with a casing wall of the casing as the mating piece, and if it is in particular provided for this casing wall to have the aperture.

In particular, it is provided for a connecting part of the urging piston that is arranged between the guide part and the urging part to be provided with the front axial abutment.

In some embodiments, it is provided for a step of the in particular one-piece urging piston to form the abutment and in particular for the connecting part to have the step.

In favorable embodiments, it is provided for the urging piston to comprise a rear axial abutment for the release end position, with the result that in particular in the release condition the urging piston is movable as far as the release end position, and in this position the rear axial abutment cooperates with a mating piece. Preferably, in this case it is provided for the rear axial abutment to be arranged on an opposite side of the urging piston to the urging part. In this case too, the mating piece could be a separate part, wherein it is advantageous if, in the release end position, the rear axial abutment cooperates with a part of the casing as the mating piece.

More detailed statements have not yet been made as regards further forms taken by the brake device.

In particularly advantageous embodiments, it is provided for the brake device to comprise a wear compensation arrangement for the two brake shoe units. In particular, this makes it possible in the event of wear to the brake pads of the brake shoe units for these to be re-adjusted and thus for the brake device to have a well-defined and pre-adjusted braking condition. For example, the wear compensation arrangement comprises an adjusting screw for re-adjusting at least one brake pad.

More detailed statements have not yet been made as regards the mechanical urging device.

It is particularly favorable if the mechanical urging device urges the brake device linearly in a direction of urging, wherein in particular the direction of urging corresponds at least approximately to the axial direction of the axis of urging.

In particularly favorable embodiments, the urging device comprises a spring element for the mechanical urging, with the result that the urging device is produced in a structurally simple manner. For example, the urging device is arranged separately from the brake device.

In particularly preferred embodiments, the mechanical urging device, in particular the spring element thereof, is arranged in the casing of the brake device, preferably in the piston guide space. As a result, a compact construction is made possible, and in particular direct urging of the urging piston is configured to be produced by the mechanical urging device.

In particular, it is provided for the mechanical urging device, in particular the spring element thereof, to be arranged such that it is supported against the urging piston.

In particular, it is provided for the urging piston to comprise a first urging face for the mechanical urging device, against which in particular the mechanical urging device, preferably the spring element thereof, is arranged such that it is supported, and urges the urging piston at this urging face. Preferably, this urging face is formed at a step of the urging piston. In this case, it is particularly favorable if the first urging face is arranged on an opposite side of the urging piston to the urging part. For example, the urging face is provided on the guide part.

It is particularly favorable if the first urging face takes a form extending at least approximately perpendicular to the axis of urging.

It is advantageous if the mechanical urging device, in particular the spring element thereof, takes a form such that it is supported against the casing, for example taking a form such that it is supported against a casing wall that delimits the piston guide space. In particular, in this case it is provided for a support face of the casing against which the mechanical urging device is supported to be arranged at an opposite axial end of the piston guide space to the aperture. In this way, particularly effective urging by the mechanical urging device is for example made possible.

It is particularly favorable if the mechanical urging device, in particular the spring element thereof, is mounted such that it is biased to urge the brake device, in particular being mounted such that it is biased into the piston guide space. In particular, this makes it possible, as a result of the bias, for the brake device always to be urged by the mechanical urging device and in this way for these together to form the parking brake device in a particularly favorable way, in that, unless the parking brake device is released, it actively performs braking and thus the demanding safety requirements in respect of activation of the parking brake device are met.

In some preferred embodiments, it is provided for the spring element to embrace part of the urging piston. For example, the spring element embraces a part of the urging piston that has the rear abutment. In particular, this provides a particularly space-saving embodiment, since in one region, in particular the piston guide space, the part of the urging piston is arranged radially inward and the spring element is arranged on the outside thereof, and thus the overall space is utilized effectively.

More detailed statements have not yet been made as regards the form taken by the hydraulic urging device.

In particular, it is provided for the hydraulic urging device to have a hydraulic pressure chamber, which is provided in particular for pressurized hydraulic medium that brings about urging of the brake device, in particular the urging piston, in the hydraulic pressure chamber. In this case, it is particularly advantageous if the piston guide space comprises the hydraulic pressure chamber, such that particularly effective urging of the urging piston can be performed.

Preferably in this case, it is provided for the hydraulic pressure chamber to be delimited by the urging piston and the casing, wherein in particular the parts of the casing that delimit the hydraulic pressure chamber also delimit the piston guide space. In this way, direct urging of the urging piston by hydraulic medium in the hydraulic pressure chamber is made possible.

In particular, it is provided for the hydraulic pressure chamber to take a form that is variable in size—that is to say that a volume of the hydraulic pressure chamber has a differing volume, depending in particular on a position of the urging piston. Preferably, in this case it is provided for the hydraulic pressure chamber to take a form that is variable in length, in particular in the direction axial in relation to the axis of urging. In particular, the hydraulic pressure chamber takes a form that is variable in length between a second urging face of the urging piston and a face of the casing opposite this urging face.

It is particularly favorable if the volume of the hydraulic pressure chamber is smaller in the braking condition than in the release condition. In particular, this makes it possible for the brake device to be moved from the braking condition to the release condition by supplying pressurized hydraulic medium to the hydraulic pressure chamber.

In some particularly advantageous embodiments, it is provided for the hydraulic pressure chamber to extend along a portion of the extent of the urging piston that is axial in relation to the axis of urging. As a result, a compact, space-saving form is for example made possible. Preferably, seals for sealing off the hydraulic pressure chamber are arranged on the urging piston, with the hydraulic pressure chamber in particular extending between two seals that are arranged on the urging piston with axial spacing.

In some preferred embodiments, it is provided for at least one seal that delimits the hydraulic pressure chamber to be arranged on an external guide face of the urging piston. This is in particular favorable if the guide part has a greater radial extent than other parts of the urging piston, with the result that the seal is preferably arranged in a region of greatest radial extent and the pressure chamber can be provided in the region of relatively small radial extent. As an alternative or in addition, the seal on the external guide faces is advantageous if the urging faces for the hydraulic and mechanical urging devices are provided on either side of the guide part, with the result that the seal seals off the hydraulic system of the hydraulic urging device from the mechanism of the mechanical urging device.

It is favorable if a seal that delimits the hydraulic pressure chamber is arranged on a part of the urging piston passing through the aperture and is thus arranged in particular in the aperture, sealing it off. In this way, the hydraulic pressure chamber in particular is then sealed off from an outside of the casing.

Preferably, the hydraulic pressure chamber is arranged in an axial end region of the piston guide space, in particular in an axial end region facing a brake side of the casing, wherein the brake shoe units are arranged on the brake side. For example, in this case the casing wall having the aperture delimits, at least in part, the hydraulic pressure chamber. In particular, in this way the pressure chamber is arranged between the brake shoe units and an urging face of the urging piston, and in this way it can urge the urging piston in the direction of the release condition in a particularly favorable manner.

Further, in favorable embodiments it is provided for radial side delimiting faces that substantially represent an axial prolongation of the piston guide faces in the axial direction, and extend in particular as far as an axial end of the piston guide space, to delimit the hydraulic pressure chamber in the radial direction.

In particular, it is provided for an orifice opening in a fluid duct to open out into the hydraulic pressure chamber. In particular, the fluid duct is provided for hydraulic medium and is part of a hydraulic system. In this case, it is favorable if the hydraulic pressure chamber is fluidically connected or connectable to the master unit by way of the fluid duct and for example a hydraulic connector. In particular, the orifice opening opens out into a minimal volume of the hydraulic pressure chamber that corresponds to the brake end position, with the result that in any position of the urging piston in the brake and release conditions—that is to say in particular during the course of normal operation—the orifice opening is preferably not closed off thereby and is in particular always unblocked in order that pressurized hydraulic medium can be supplied to the hydraulic pressure chamber.

In this case, in preferred embodiments it is provided for the orifice opening to be arranged in an end region of the piston guide space that is axial in relation to the axis of urging.

Preferably, the orifice opening is arranged on a side delimiting face of the piston guide space that is radial in relation to the axis of urging, wherein the radial side delimiting face extends in particular between the piston guide face and an axial end of the piston guide space. In other preferred embodiments, it is provided for the orifice opening to be arranged at an axial end face of the piston guide space.

More detailed statements have not yet been made as regards the further configuration of the hydraulic urging device and the hydraulic system.

In particular, the hydraulic system of the hydraulic urging device is constructed in accordance with use for a vehicle, in particular a lightweight vehicle.

For example, the hydraulic system is constructed for pressures of at least 50 bar, preferably at least 70 bar, for example at least 90 bar and/or at most 250 bar, in particular at most 200 bar, for example at most 150 bar.

In particular, the hydraulic lines and/or fluid ducts of the hydraulic system are constructed in accordance with use for a vehicle, in particular a lightweight vehicle. For example, the hydraulic lines and/or fluid ducts have an internal diameter that is in particular greater than 1 mm, in particular greater than 5 mm, and/or is at most 30 mm, in particular at most 20 mm.

The hydraulic urging device is in particular constructed for use in vehicles, in particular lightweight vehicles. For example, it is constructed to provide urging forces of at least 10 newtons, in particular at least 30 newtons, preferably at least 50 newtons, and/or is constructed for urging forces of at most 150 newtons, in particular at most 120 newtons, preferably at most 100 newtons.

Moreover, the object of the invention is achieved, in a further aspect thereof, as an alternative or in addition by a braking system for a vehicle, in particular a lightweight vehicle, in particular a pedal cycle, having a hydraulic urging device for a brake device, wherein the hydraulic urging device comprises a hydraulic pressure chamber and a valve control.

In particular, this aspect relates to an advantageous embodiment of the valve control for particularly favorable control of the hydraulic medium. For example, according to this aspect of the invention the hydraulic urging device is provided with the valve control in a braking system having a parking brake device as provided in the manner explained above. The hydraulic urging device having the valve control according to this aspect of the invention may, however, also be used to advantage with other braking systems, wherein it is particularly preferred if the brake device or the further configuration of the braking system has one or more of the features and/or elements mentioned above and below.

Preferably, the hydraulic urging device, for example a hydraulic system thereof, has a master unit for providing pressurized hydraulic medium.

In preferred embodiments, it is provided for the master unit to be a hand-actuated master unit.

In other advantageous embodiments, it is provided for the master unit to be a foot-actuated master unit.

Foot-actuated or hand-actuated master units of this kind are particularly favorable, in particular for lightweight vehicles, and make it possible for the person riding the vehicle, in particular the lightweight vehicle, to operate it in a simple manner.

It is advantageous if the master unit comprises a compensation tank having a reservoir for hydraulic medium. In particular, in this way a reserve of hydraulic medium can be provided in the reservoir in order for example to compensate for small losses of hydraulic medium, for example in the event of leaky points in the hydraulic system, and/or in order to compensate for fluctuations in the quantity of hydraulic medium present in the hydraulic medium consuming devices that are connected to the master unit, for example in the hydraulic pressure chamber, which may occur as a result of wear to a brake pad.

For example, the master unit and/or the hydraulic urging device take a form such that, by means of the hydraulic urging device, the brake device is already put into its release condition already after approximately half a stroke of the master unit. In the case of other advantageous embodiments, it is provided for approximately up to a complete stroke of the master unit or, where appropriate, even a plurality of strokes to be necessary in order to put the brake device into its release condition by means of the hydraulic urging device.

More detailed statements have not yet been made as regards the construction of the valve control.

It is advantageous if the valve control comprises a supply valve, which in an open condition enables a through-flow of hydraulic medium in an unblocking direction that is oriented from a hydraulic connector, to which a master unit is connected and/or connectable, to the hydraulic pressure chamber, wherein the supply valve in particular has a blocking condition in which no through-flow of hydraulic medium through the supply valve is possible. In this way, for example in the open condition, pressurized hydraulic medium can be supplied to the pressure chamber by the master unit, whereas in the blocking condition the supply valve blocks through-flow and in this way keeps through pressurized hydraulic medium in the pressure chamber. This is particularly advantageous with the hydraulic release device, since in this way pressurized hydraulic medium can be supplied by the supply valve and the brake device can be put into the release condition for example by means of the urging piston, and in the blocking condition the pressurized hydraulic medium remains in the pressure chamber and thus keeps the brake device in the release condition.

In particular, the hydraulic connector is provided on the casing of the brake device. In particular, within the casing the hydraulic connector is connected to the hydraulic pressure chamber by means of fluid ducts. In an assembled condition, the master unit is connected to the hydraulic connector.

In particular, it is provided for the supply valve to comprise a valve body and a valve seat, wherein, in the open condition, the valve body in particular adopts an open position that is spatially at a distance from the valve seat, and in the blocking condition the valve body and the valve seat cooperate in fluid-tight manner. In this way, in the open position the valve body is thus arranged such that it is spatially at a distance from the valve seat, and a through-flow of hydraulic medium is enabled, whereas in the blocking condition the supply valve blocks through-flow of hydraulic medium as a result of the fluid-tight cooperation.

It is particularly advantageous if the valve body is arranged on the pressure chamber side of the valve seat. In particular, the valve body is in this way arranged on a side of the valve seat that, in relation to the fluid connection, faces the hydraulic pressure chamber, in which case it is for example advantageous that, when pressurized hydraulic medium is provided by way of the hydraulic connector, it can push the valve body out of the valve seat and move it into the open position, with the result that when the pressurized hydraulic medium is provided the supply valve is also simultaneously opened and so the pressurized hydraulic medium reaches the hydraulic chamber in a simple manner, for the purpose of putting the brake device into the release condition. In particular, in this case at least the hydraulic medium on the pressure chamber side also supports urging the valve body on the pressure chamber side into the blocking position.

Preferably, it is provided for the valve seat to have a seal for the purpose of receiving the valve body in its blocking position. The valve body adopts the blocking position in the blocking condition of the supply valve. For example, the seal is a sealing ring, and in particular takes a form that surrounds a valve leadthrough. In this way, preferably particularly good sealing off is achieved in the blocking condition. In particular, the seal is arranged on the pressure chamber side of the valve seat, in particular if the valve body is arranged on the pressure side.

Preferably, it is provided for the supply valve to be a spring-loaded valve, as a result of which in particular the valve body is urged into a home position by the spring loading. It is particularly advantageous if the valve body is spring-loaded in the direction of its blocking position, with the result that, in the absence of further urging, in particular the supply valve remains in the blocking condition as the home position, and thus seals off the hydraulic pressure chamber. For example, the valve body is urged by means of a valve spring that is constructed for example as a position-holding spring such that it merely keeps the valve body, which is in particular on the pressure chamber side, in the vicinity of the valve seat, in order to prevent it from coming away from the valve seat. In this case, it is in particular provided for the spring to take a form that is sufficiently weak for the valve body to be urged, for the purpose of putting it into its open position and/or blocking position, in particular by the differences in pressure in the hydraulic medium on the pressure chamber side and the hydraulic connector side of the valve seat. One advantage of this can be seen for example in the fact that, in order to open the supply valve, a person riding the vehicle merely has to provide the required pressurized hydraulic medium, but in so doing need exert substantially no additional force in order for the valve body to be put into the open position by means of the hydraulic medium, in opposition to urging by the position-holding spring. On the other hand, it is favorable if, as a result of its positive pressure, the pressurized hydraulic medium in the pressure chamber automatically closes the supply valve, with the result that the supply valve blocks through-flow of hydraulic medium, and the brake device remains in its release condition as a result of the pressurized hydraulic medium.

In particularly preferred embodiments, it is provided for the supply valve to be a hydraulically actuated valve. In particular, the supply valve is constructed and takes a form such that it is put into its open condition by pressurized hydraulic medium that is provided by way of the hydraulic connector. In particular, the supplied hydraulic medium is provided by the master unit. This in particular enables easy operation of the supply valve, in particular actuation thereof at the same time as pressurized hydraulic medium is provided. In particular, combining it with a spring loading as explained above is particularly favorable.

In a particularly favorable embodiment, the valve control comprises a release valve, which in an unblocking condition enables a through-flow of hydraulic medium from the hydraulic pressure chamber. In particular, the release valve also has a closed condition, in which the release valve acts to close in fluid-tight manner, in particular in relation to hydraulic medium in the hydraulic pressure chamber. The release valve is particularly favorable for the hydraulic release device, since putting the release valve into the unblocking condition allows pressurized hydraulic medium to escape from the hydraulic pressure chamber and thus in particular the action of the mechanical urging device moves the brake device from the release condition into the braking condition. Moreover, in particular the release valve closes the hydraulic pressure chamber such that it is fluid-tight in the closed condition, with the result that in the closed condition pressurized hydraulic medium cannot escape through the release valve and out of the hydraulic pressure chamber, and thus in particular the braking piston remains in a release position and thus the brake device remains in the release condition.

It is particularly favorable if the release valve comprises a closing body, which in the closed condition adopts a closed position. In the closed position, the closing body has a fluid-tight sealing effect, in particular cooperating with a seal.

In preferred embodiments, the release valve is a spring-loaded valve, and in particular in this case the closing body is spring-loaded in the direction of its closed position. In this way, in particular the release valve remains in its home position, which is predetermined by the spring loading—that is to say in particular in its closed position. For example, this is advantageous because in this way the release valve closes unless it is actuated, and consequently, as a result of the fluid-tight sealing, pressurized hydraulic medium remains in the pressure chamber and in particular as a result the brake device remains in its release condition.

More detailed statements have not yet been made as regards actuation of the release valve. In this context, different ways of actuating the release valve are provided in different embodiments.

In a particularly favorable embodiment, it is provided for the release valve to be movable into the unblocking condition by means of a release arrangement. For example, the release arrangement is a mechanical release arrangement, so it acts mechanically on the release valve, in particular to move it into the unblocking condition. In the case of the release device, this is particularly favorable in order for the release arrangement to enable the release valve for the purpose of draining hydraulic medium out of the pressure chamber such that the brake device is put into the braking condition, in particular as the effect produced by the mechanical urging device intensifies.

In particular, it is provided for the release arrangement in an actuation position to move the release valve into the unblocking condition. In particularly favorable embodiments, it is provided for the release arrangement to be movable into the actuation position by means of a Bowden cable. This is particularly favorable for example in the case of lightweight vehicles, with the result that a person riding them can actuate the release valve in a simple manner by means of the release arrangement.

In particularly advantageous embodiments, it is provided for the release arrangement to be spring-loaded. This has the result in particular that the release arrangement is put into a desired home position by the spring loading unless it is actuated. Preferably, it is provided for the release arrangement to be moved out of the actuation position by the spring loading. This is advantageous for example in order to ensure that only if the release arrangement is actuated does it act on the release valve.

In particular, in the home position the release arrangement does not substantially act on the release valve—at least, it does not act on the release valve such that the release valve is put into the unblocking condition.

In particular, it is provided for the release arrangement to comprise an activation element by means of which, in particular in the actuation position, the release valve is movable into the unblocking condition.

For example, at least in the actuation position the activation element acts directly on the release valve, for example on the closing body thereof.

In other preferred embodiments, it is provided, at least in the actuation position, for the activation element to act indirectly on the release valve. For example, there is provided a plunger on which the activation element acts, in particular directly, and by means of which the release valve is put into the unblocking condition.

In particular, the activation element is mounted to be movable, wherein a home position and the actuation position correspond to different positions of the mounting.

In different embodiments, different mountings are provided.

Preferably, the activation element is mounted to be rotatable.

In preferred embodiments, it is provided for the home position and the actuation position of the release arrangement to correspond to different angular positions of the activation element in relation to an activation axis. In particular in this case, it is provided for a rotation of the activation element about the activation axis to bring about transfer from the home position to the actuation position. In particular here, a rotation in an opposing direction also brings about a transfer from the actuation position to the home position.

For example, the angular positions that correspond to the home position and the actuation position differ by at most 180°, for example by at most 90°, preferably by at most 50°, for example by at most 20°. It is preferred if the angular positions that correspond to the home position and the actuation position differ by at least 1°, preferably by at least 5°. In particular, a rotation of the activation element about the activation axis by an angle as explained above also brings about transfer from the home position to the actuation position, or in the case of rotation in an opposing direction brings about transfer from the actuation position to the home position.

In particular, it is provided for the activation element to be arranged on the side of the hydraulic connector to the valve seat. For example, this enables favorable action for the purpose of putting the release valve into the unblocking condition, in opposition to the pressure of the hydraulic medium in the pressure chamber.

In some preferred embodiments, it is provided for the Bowden cable to be coupled, in particular directly, such that it acts on the activation element, and for actuation of the Bowden cable to move the activation element into the actuation position, in particular bringing about a rotation of the activation element that is required for this.

In preferred embodiments, it is provided for the release arrangement to comprise a plunger. Preferably, in the actuation position the plunger acts on the release valve, for example on the closing body, putting the release valve into the unblocking condition. In particular in this case, the plunger acts directly on the closing body. For example, in the actuation position the plunger pushes the closing body out of a closed position and in particular spatially away from the seal.

It is particularly favorable if the plunger passes through a valve leadthrough of the valve seat, at least in the actuation position. For example, this enables the plunger to act on the closing body in a structurally simple manner, in order in the actuation position to push the closing body spatially away from the valve seat.

Further, it is advantageously provided for the activation element to have a displacing portion, wherein the displacing portion acts on the plunger, in particular directly, when there is a transfer from the home position to the actuation position.

It is particularly preferred if the activation element has a receptacle for the plunger, wherein the plunger is received in the receptacle in the home position and, when there is a transfer from the home position to the actuation position, the displacing portion displaces the plunger from the receptacle.

It is particularly favorable if the activation element takes a form having a receptacle for the plunger and for example having further features as explained above, in the case of the activation element that is arranged to be rotatable about the activation axis as explained above.

In particularly favorable embodiments, it is provided for the valve control to comprise a check valve. Preferably, the check valve comprises one or more of the features explained above in relation to the supply valve and/or the release valve. In particular, functions of the valve control are particularly simple to fulfill with a check valve taking such a form. In particular, it is provided for the check valve to be a spring-loaded and/or releasable and/or mechanically actuable check valve, wherein, in respect of the advantages thereof and further details thereof, the reader is referred in particular to the statements made in relation to the supply valve and the release valve, in order to avoid repetition.

In particularly advantageous embodiments, it is provided for the check valve to form the supply valve and/or the release valve. In this way, the supply valve and/or the release valve thus takes the form of a check valve, wherein in particular the features explained above in relation to these valves are producible in a structurally simple manner in the case of a check valve, in particular of the type mentioned above.

In some advantageous embodiments, it is provided for the valve control to comprise a multiway valve. For example, one advantage thereof is that a plurality of consuming devices of the pressurized hydraulic medium that is made available by the master unit are connectable to the multiway valve, and a supply of this hydraulic medium to the consuming devices can be controlled particularly favorably by means of the multiway valve. For example, a 3-way valve is provided, with the result that two consuming devices are connectable.

In particular, in respect of the hydraulic urging device connected to the multiway valve, this valve has the open condition and blocking condition of the supply valve and/or the release valve, and the closed condition of the release valve, so the reader is referred to the entire content of the statements made above for preferred configurations of the multiway valve and the corresponding conditions.

In some favorable embodiments, it is provided for the supply valve and the release valve to be separate valves. For example, in that case they may take a form that corresponds to their specific requirements and yet is structurally simple.

In other advantageous embodiments, it is provided for the supply valve and the release valve to take the form of a common valve, in particular together taking the form of a check valve. It is particularly preferred if this check valve has one or more of the features explained above in relation to the check valve. One advantage of this solution can be seen in the fact that, as a result of the supply valve and the release valve taking a common form, the valve control can take a more compact form, and this complex valve control is also configured to be arranged in the small space available in lightweight vehicles.

More detailed statements have not yet been made as regards the arrangement of the valves.

In some embodiments, it is provided for at least one of the valves, for example a plurality of the valves of the valve control, to be provided as separate units, for example outside the casing of the brake device.

In particularly preferred embodiments, it is provided for the valve control to be at least partly integrated in the casing of the brake device. This is particularly advantageous in particular in the case of lightweight vehicles, since they have little space available, and the integrated formation of the valve control means that less space is required.

In this case, it is provided in particular for at least one valve, preferably a plurality, for example all, of the valves of the valve control to be arranged in the casing. In this way, in particular the supply valve and/or the release valve and/or the check valve is/are arranged in the casing.

Preferably in this case, it is provided for the casing to have a valve chamber with at least one valve of the valve control. For example, the supply valve and/or the release valve and/or the check valve are formed in the valve chamber.

Preferably, the valve body and/or the closing body are arranged in the valve chamber.

It is particularly preferred if the valve spring is arranged in the valve chamber.

It is particularly advantageous if the activation element is at least substantially arranged in the casing. For example, there projects out of the casing only an activation portion, by way of which the activation element is movable into the home position and/or the actuation position, and on which in particular the Bowden cable acts. In this way, for example the release arrangement is also arranged substantially in the casing, and the valve control thus takes an even more compact and space-saving form.

It is particularly favorable if the activation element is arranged to be at least partly rotatable about the activation axis in relation to the casing, in particular substantially therein, with the result that for example, as explained above, the activation element is favorably movable into another position as a result of rotation.

It is particularly advantageous if the activation element is arranged at least partly, and in particular with the receptacle, in a fluid duct that is formed by the casing. For example, the effect of this is that the activation element can act directly on the release valve, for example by means of the plunger. In particular in this case there is provided a connecting duct, which fluidically connects the valve chamber to the fluid duct that has the activation element, and which is preferably also formed by the casing. In this case, it is particularly favorable if this connecting duct forms the valve leadthrough of a valve of the valve control, for example the valve leadthrough of the supply valve and/or the release valve and/or the check valve. This in particular enables compact construction of the valve control and the release arrangement. In particular in this case, action of the plunger can be brought about in a particularly favorable manner if the plunger is arranged in the connecting duct such that it can be coupled to the activation element at one end of the plunger, for example being able to be received in the receptacle, and can act on the valve at its opposite end.

More detailed statements have not yet been made as regards further configurations of the braking system.

It is particularly advantageous if the braking system comprises an operating brake. In this case, the operating brake is provided in particular in order to perform braking on the vehicle during travel thereof, in order to achieve a reduction in speed, for example from a high speed of travel to a lower speed of travel that is nonetheless greater than zero. In this way, the operating brake is thus in particular provided in order to control the speed of the vehicle during travel thereof. In particular in this case, during travel the speed control also comprises reducing the speed of travel to zero in order to arrive at standstill of the vehicle. In particular, the operating brake acts to perform braking when it is actuated, for example by the person riding the vehicle, preferably by means of a brake ring that is arranged on a wheel of the vehicle. For example, the operating brake is thus a disk brake. However, the operating brake is not suitable for keeping the vehicle at a standstill, since the operating brake in particular only performs braking while it is being actuated, and to keep the vehicle at a standstill a brake—such as a parking brake—that also performs braking when actuation thereof is at an end is desirable.

It is particularly favorable if the operating brake is a hydraulic operating brake. In this case, it is preferably provided for the hydraulic operating brake to be fluidically connectable to a master unit and/or to be fluidically connected to the master unit such that pressurized hydraulic medium can be made available to the hydraulic operating brake, in particular by means of the master unit.

In particular in this case, the operating brake is connectable and/or connected to the same master unit as the hydraulic urging device. For example, one advantage of this is that both the operating brake and the hydraulic urging device are actuable using the same master unit, and in this way only one master unit is required, in a manner saving space, and operation of the braking system is simpler using only one master unit.

In particular, it is a particular advantage that actuation of the one master unit on the one hand moves the operating brake into a condition performing braking, and on the other triggers the release device that is formed by the hydraulic urging device. In this way, a person riding the vehicle can release the parking brake and at the same time move the operating brake into the condition performing braking, with the result that when the parking brake is released, until actuation of the master unit comes to an end defined by the person riding the vehicle, at all times one of the brakes is acting to brake the vehicle, as a result of which starting up is preferably made easier, since even when the parking brake is released an undesired moving off of the vehicle is at least made more difficult or even prevented.

For example, in the case of the braking system having the operating brake and the parking brake, the valve control has the multiway valve, with the result that it is possible by means of this to control which of the brakes is to be provided with the pressurized hydraulic medium made available by the master unit.

In other favorable embodiments, it is provided for the hydraulic operating brake to be fluidically connectable and/or connected substantially directly to the master unit and for the valve control in particular to comprise the supply valve and the release valve, which in particularly favorable solutions together take the form of the check valve, and for the hydraulic pressure chamber of the hydraulic urging device to be fluidically connectable and/or connected, as explained above, to the master unit by way of the valve control. For example, with this solution the advantage of simultaneously actuating the operating brake and triggering the hydraulic release device by means of providing pressurized hydraulic medium by actuating the master unit is manifested in a particularly favorable manner.

In particularly preferred embodiments, it is provided for the brake device to comprise an adjusting arrangement. In this case, the adjusting arrangement is provided for the purpose of adjusting the brake device when it is mounted on a vehicle, for example in order to achieve a desired and well-defined orientation of the brake device in the condition mounted on the vehicle. In particular, proper adjustment and well-defined orientation of the brake device are required for substantially drag-free action of the brake device, wherein this is particularly desired and required in the case of lightweight vehicles. In particular, orientation of the brake shoe units in relation to the brake ring is required here.

In particularly advantageous embodiments, it is provided for the casing to comprise the adjusting arrangement. For example, in this case the adjusting arrangement has flange projections that extend from the casing, in particular having at least one slot for adjustment by means of securing devices.

As an alternative or in addition, the solution according to the invention also relates to a vehicle having a braking system that comprises at least one, preferably a plurality, of the features explained above.

In this case, the vehicle is in particular a lightweight vehicle as explained in the introduction.

In the foregoing and below, the term "at least approximately" in conjunction with a quantity should be understood in particular to mean that deviations from the quantity that are due to technical limitations and/or are not technically relevant are also included. For example, deviations of up to 20%, preferably up to 10%, for example up to 5%, from the quantity are also included.

Thus, the description above of solutions according to the invention comprises in particular the different combinations of features that are defined by the sequentially numbered embodiments below:

1. A braking system (100) for a vehicle (112), in particular a lightweight vehicle, in particular a pedal cycle, comprising a brake device (212), a mechanical urging device (214), and a hydraulic urging device (216), wherein the mechanical urging device (214) and the brake device (212) form a parking brake device (210), and the hydraulic urging device (216) takes the form of a hydraulically actuable release device (218) for the parking brake device (210).

2. The braking system (100) according to embodiment 1, wherein the braking system has at least one braking condition and at least one release condition, wherein the parking brake device (210) performs braking in the braking condition and is inactive in the release condition.

3. The braking system (100) according to one of the preceding embodiments, wherein the mechanical urging device (214) is formed and arranged in relation to the brake device (212) such that urging by the mechanical urging device (214) puts the brake device (212) into the braking condition.

4. The braking system (100) according to one of the preceding embodiments, wherein the hydraulic urging device (216) is formed and arranged in relation to the brake device (212) such that urging by the hydraulic urging device (216) puts the brake device (212) into the release condition.

5. The braking system (100) according to one of the preceding embodiments, wherein the brake device (212) comprises two brake shoe units (312, 314), which in particular act to perform braking in the braking condition, in particular cooperating with a brake ring to perform braking.

6. The braking system (100) according to the preceding embodiment, wherein the two brake shoe units (312, 314) define between them a brake receiving space (316) that is provided in particular for receiving at least one portion of the brake ring, and wherein in particular the brake receiving space (316) is smaller in the braking condition than in the release condition.

7. The braking system (100) according to one of the preceding embodiments, wherein it, in particular the brake device (212), comprises at least one, in particular precisely one, urging piston (352), wherein in particular, when the urging piston (352) is urged, it puts the brake device (212) into another condition, in particular puts it into the at least one braking condition and/or the at least one release condition in dependence on the orientation of a direction of urging.

8. The braking system (100) according to one of the preceding embodiments, wherein the urging piston (352) is arranged in a piston guide space (362) of a casing (302) of the brake device (212), in particular in that the urging piston (352) is arranged in the casing (302) such that it is linearly movable relative thereto in a direction of urging.

9. The braking system (100) according to the preceding embodiment, wherein the piston guide space (362) has piston guide faces (368), and in that the urging piston (352) is arranged along the piston guide faces (368) and guided thereby such that it is movable in the casing (302).

10. The braking system (100) according to one of the preceding embodiments, wherein at least one of the brake shoe units (312, 314) is coupled to the urging piston to perform urging, in particular in that, at least in the braking condition, at least one of the brake shoe units (312, 314) is urged by the urging piston (352).

11. The braking system (100) according to one of the preceding embodiments, wherein a brake pad of a brake shoe unit (312, 314) is arranged on the urging piston (352), in particular on a front side (354) thereof, in particular being held magnetically.

12. The braking system (100) according to one of the preceding embodiments, wherein the urging piston (352) passes, at least by means of an urging part (382), through an aperture (384) in the casing, out of which it projects, and in that it urges the at least one brake shoe unit (312, 314) in particular by means of the part projecting out of the aperture (384).

13. The braking system (100) according to the preceding embodiment, wherein a seal is arranged in the aperture (384), for sealing off the piston guide space (362).

14. The braking system (100) according to one of the preceding embodiments, wherein the urging piston (352) and the two brake shoe units (312, 314) are arranged substantially along an axis of urging (306).

15. The braking system (100) according to one of the preceding embodiments, wherein the urging piston (352) substantially takes the form of a one-piece body.

16. The braking system (100) according to one of the preceding embodiments, wherein the urging piston (352) comprises at least an urging part (382) and a guide part (364), wherein in particular a radial extent of the urging part (382) is smaller than a radial extent of the guide part (364).

17. The braking system (100) according to one of the preceding embodiments, wherein the urging piston (352) comprises a front axial abutment (388) for a brake end position, wherein in particular in the brake end position the front axial abutment (388) cooperates with a casing wall (392) of the casing (302) that has in particular the aperture (384), and wherein in particular a connecting part (386) of the urging piston (352), arranged between the guide part (364) and the urging part (382), is provided with the front axial abutment (388).

18. The braking system (100) according to one of the preceding embodiments, wherein the urging piston (352) comprises a rear axial abutment (394) for a release end position, wherein in particular the rear axial abutment (394) is arranged on an opposite side of the urging piston (352) to the urging part (382), and in that, in the release end position, in particular the rear axial abutment (394) cooperates with a part of the casing (302).

19. The braking system (100) according to one of the preceding embodiments, wherein the brake device (212) comprises a wear compensation arrangement (332) for the two brake shoe units (312, 314).

20. The braking system (100) according to one of the preceding embodiments, wherein the mechanical urging device (214) urges the brake device (212) linearly in the direction of urging.

21. The braking system (100) according to one of the preceding embodiments, wherein the mechanical urging device (214), in particular a spring element (422) thereof, is arranged in the piston guide space (362).

22. The braking system (100) according to one of the preceding embodiments, wherein the mechanical urging device (214), in particular the spring element (422) thereof, is arranged (412) such that it is supported against the urging piston (352).

23. The braking system (100) according to one of the preceding embodiments, wherein a first urging face (412) of the urging piston (352) for the mechanical urging device (214) is arranged on an opposite side to the urging part (382), in particular on the guide part (364).

24. The braking system (100) according to one of the preceding embodiments, wherein the first urging face (412) takes a form extending at least approximately perpendicular to the axis of urging (306).

25. The braking system (100) according to one of the preceding embodiments, wherein the mechanical urging device (212), in particular the spring element (422) thereof, takes a form such that it is supported against a casing wall that delimits the piston guide space (362), wherein in particular a support face of the casing (302) against which the mechanical urging device (212) is supported is arranged at an opposite axial end of the piston guide space (362) to the aperture (384).

26. The braking system (100) according to one of the preceding embodiments, wherein the mechanical urging device (212), in particular the spring element (422) thereof, is mounted such that it is biased to urge the brake device (212).

27. The braking system (100) according to one of the preceding embodiments, wherein the spring element (422) embraces part of the urging piston (352).

28. The braking system (100) according to one of the preceding embodiments, wherein the hydraulic urging device (216) has a hydraulic pressure chamber (256), wherein in particular the piston guide space (362) comprises the hydraulic pressure chamber (256).

29. The braking system (100) according to one of the preceding embodiments, wherein the hydraulic pressure chamber (256) is delimited by the urging piston (352) and the casing (302).

30. The braking system (100) according to one of the preceding embodiments, wherein a volume of the hydraulic pressure chamber (256) is smaller in the braking condition than in the release condition.

31. The braking system (100) according to one of the preceding embodiments, wherein the hydraulic pressure chamber (256) extends along a partial portion of the extent of the urging piston (352) that is axial in relation to the axis of urging (306), in particular extending between two seals that are arranged on the urging piston (352) with axial spacing.

32. The braking system (100) according to one of the preceding embodiments, wherein at least one seal that delimits the hydraulic pressure chamber (352) is arranged on an external guide face (366) of the urging piston (352) and/or on a part of the urging piston (352) passing through the aperture (384).

33. The braking system (100) according to one of the preceding embodiments, wherein the hydraulic pressure chamber (256) is arranged in an axial end region (372) of the piston guide space (362), wherein in particular the casing wall having the aperture (384) delimits, at least in part, the hydraulic pressure chamber (256).

34. The braking system (100) according to one of the preceding embodiments, wherein an orifice opening (538) in a fluid duct (516) opens out into the hydraulic pressure chamber (256) and in particular into a minimal volume of the hydraulic pressure chamber (256) that corresponds to the brake end position.

35. The braking system (100) according to one of the preceding embodiments, wherein the orifice opening (538) is arranged in an end region of the piston guide space (362) that is axial in relation to the axis of urging (306) and/or is arranged on a side delimiting face of the piston guide space (362) that is radial in relation to the axis of urging (306).

36. A braking system (100) for a vehicle (112), in particular a lightweight vehicle, in particular a pedal cycle, in particular according to one of the preceding embodiments, having a hydraulic urging device (216) for a brake device (212) that comprises a hydraulic pressure chamber (256) and a valve control (550).

37. The braking system (100) according to one of the preceding embodiments, wherein the hydraulic urging device (216) comprises a master unit (222) for providing a pressurized hydraulic medium (550).

38. The braking system (100) according to one of the preceding embodiments, wherein the master unit (222) is a foot-actuated or hand-actuated master unit.

39. The braking system (100) according to one of the preceding embodiments, wherein the master unit (222) comprises a compensation tank (228) having a reservoir for hydraulic medium.

40. The braking system (100) according to one of the preceding embodiments, wherein the valve control (550) comprises a supply valve (552), which in an open condition enables a through-flow of hydraulic medium in an unblocking direction that is oriented from a hydraulic connector (564), to which a master unit (222) is connected and/or connectable, to the hydraulic pressure chamber (256), wherein the supply valve (552) in particular also has a blocking condition in which no through-flow of hydraulic medium through the supply valve (552) is possible.

41. The braking system (100) according to one of the preceding embodiments, wherein the supply valve (552) comprises a valve body (572) and a valve seat (576), wherein, in the open condition, the valve body in particular adopts an open position that is spatially at a distance from the valve seat (576), and in the blocking condition the valve body (572) and the valve seat (576) cooperate in fluid-tight manner.

42. The braking system (100) according to one of the preceding embodiments, wherein the valve body (572) is arranged on the pressure chamber side of the valve seat (576).

43. The braking system (100) according to one of the preceding embodiments, wherein the valve seat (576) has a seal, in particular a sealing ring, for the purpose of receiving the valve body (572) in its blocking position, which the valve body (572) adopts in the blocking condition.

44. The braking system (100) according to one of the preceding embodiments, wherein the supply valve (552) is a spring-loaded valve.

45. The braking system (100) according to the preceding embodiment, wherein the valve body (572) is spring-loaded (568) in the direction of its blocking position, wherein in particular a valve spring (568) is constructed such that it yields in relation to pressurized hydraulic medium that is provided by way of the hydraulic connector (564).

46. The braking system (100) according to one of the preceding embodiments, wherein the supply valve (552) is a hydraulically actuated valve, wherein in particular the supply valve (552) is put into its open condition by pressurized hydraulic medium that is provided by way of the hydraulic connector (564).

47. The braking system (100) according to one of the preceding embodiments, wherein the valve control (550) comprises a release valve (554), which in an unblocking condition enables a through-flow of hydraulic medium from the hydraulic pressure chamber (256), and in particular has a closed condition, in which the release valve (554) acts to close in fluid-tight manner, in particular in relation to hydraulic medium in the hydraulic pressure chamber (256).

48. The braking system (100) according to one of the preceding embodiments, wherein the release valve (554) comprises a closing body (574), which in the closed condition adopts a closed position, in which it in particular has a fluid-tight effect by means of a seal (582).

49. The braking system (100) according to one of the preceding embodiments, wherein the release valve (554) is a spring-loaded valve, wherein in particular the closing body (574) is spring-loaded in the direction of its closed position.

50. The braking system (100) according to one of the preceding embodiments, wherein the release valve (554) is movable into the unblocking condition by means of an in particular mechanical release arrangement (586).

51. The braking system (100) according to one of the preceding embodiments, wherein, in an actuation position, the release arrangement (586) moves the release valve (554) into the unblocking condition, wherein in particular the release arrangement (586) is movable into the actuation position by means of a Bowden cable.

52. The braking system (100) according to one of the preceding embodiments, wherein the release arrangement (586) is spring-loaded, wherein in particular the release arrangement (586) is moved out of the actuation position by the spring loading and in particular is put into a home position.

53. The braking system (100) according to one of the preceding embodiments, wherein the release arrangement (586) comprises an activation element (592) by means of which, in the actuation position, the release valve (554) is moved into the unblocking condition.

54. The braking system (100) according to one of the preceding embodiments, wherein the home position and the actuation position of the release arrangement (586) correspond to different angular positions of the activation element (592) in relation to an activation axis (594), and wherein in particular a rotation of the activation element (592) about the activation axis (594) brings about transfer from the home position to the actuation position.

55. The braking system (100) according to one of the preceding embodiments, wherein the release arrangement (586) comprises a plunger (624) and the activation element (592) has a displacing portion (632), wherein the displacing portion (632) acts on the plunger (624) when there is a transfer from the home position to the actuation position.

56. The braking system (100) according to one of the preceding embodiments, wherein the activation element (592) has a receptacle (622) for the plunger (624), wherein the plunger (624) is received in the receptacle (622) in the home position and, when there is a transfer from the home position to the actuation position, the displacing portion (632) displaces the plunger (624) from the receptacle.

57. The braking system (100) according to one of the preceding embodiments, wherein the plunger (624) passes through a valve leadthrough (626) of the valve seat (576), at least in the actuation position.

58. The braking system (100) according to one of the preceding embodiments, wherein the activation element (592) is arranged on the side of the hydraulic connector (564) to the valve seat (576).

59. The braking system (100) according to one of the preceding embodiments, wherein the valve control (550) comprises a check valve (558), wherein in particular the check valve (558) comprises one or more of the features of the supply valve (552) and/or the release valve (554) according to one or more of the preceding embodiments, wherein in particular the check valve (558) is a spring-loaded and/or releasable and/or mechanically actuable check valve (558).

60. The braking system (100) according to one of the preceding embodiments, wherein the check valve (558) forms the supply valve (552) and/or the release valve (554).

61. The braking system (100) according to the preceding embodiment, wherein the valve control (550) comprises a multiway valve (712), in particular a three-way valve.

62. The braking system (100) according to one of the preceding embodiments, wherein the supply valve (552) and the release valve (554) take the form of a single valve (552, 554, 558).

63. The braking system (100) according to one of the preceding embodiments, wherein the valve control (550) is at least partly integrated in the casing (302), in particular in that the supply valve (552) and/or the release valve (554) and/or the check valve (558) is/are arranged in the casing (302).

64. The braking system (100) according to one of the preceding embodiments, wherein the casing (302) has a valve chamber (562) with at least one valve of the valve control (550).

65. The braking system (100) according to the preceding embodiment, wherein the valve body (572) and/or the closing body (574) and in particular the valve spring (568) are arranged in the valve chamber (562).

66. The braking system (100) according to one of the preceding embodiments, wherein the activation element (592) is at least substantially arranged in the casing (302), being at least partly rotatable about the activation axis (594) in particular in relation to the casing (302).

67. The braking system (100) according to one of the preceding embodiments, wherein the activation element (592) is arranged at least partly, and in particular with the receptacle (AU), in a fluid duct that is formed by the casing (302), and wherein in particular a connecting duct (578), which fluidically connects the valve chamber (562) to the fluid duct that has the activation element (592), forms the valve leadthrough of a valve of the valve control (550).

68. The braking system (100) according to one of the preceding embodiments, wherein it comprises an in particular hydraulic operating brake (BBR) which, in particular by means of the valve control (550), is fluidically connectable to a master unit (222) and/or is fluidically connected to the master unit (222).

69. The braking system (100) according to one of the preceding embodiments, wherein the brake device (212), in particular the casing (302) thereof, comprises an adjusting arrangement (670), for the purpose of adjusting the brake device (212) when it is mounted on a vehicle (112).

70. A vehicle (112), in particular a lightweight vehicle, in particular a pedal cycle, comprising a braking system (100) according to one of the preceding embodiments.

Further advantages and preferred features of the solution according to the invention form the subject matter of the description below of some exemplary embodiments, and their representation in the drawing.

DETAILED DESCRIPTION OF THE INVENTION

Figure 1:
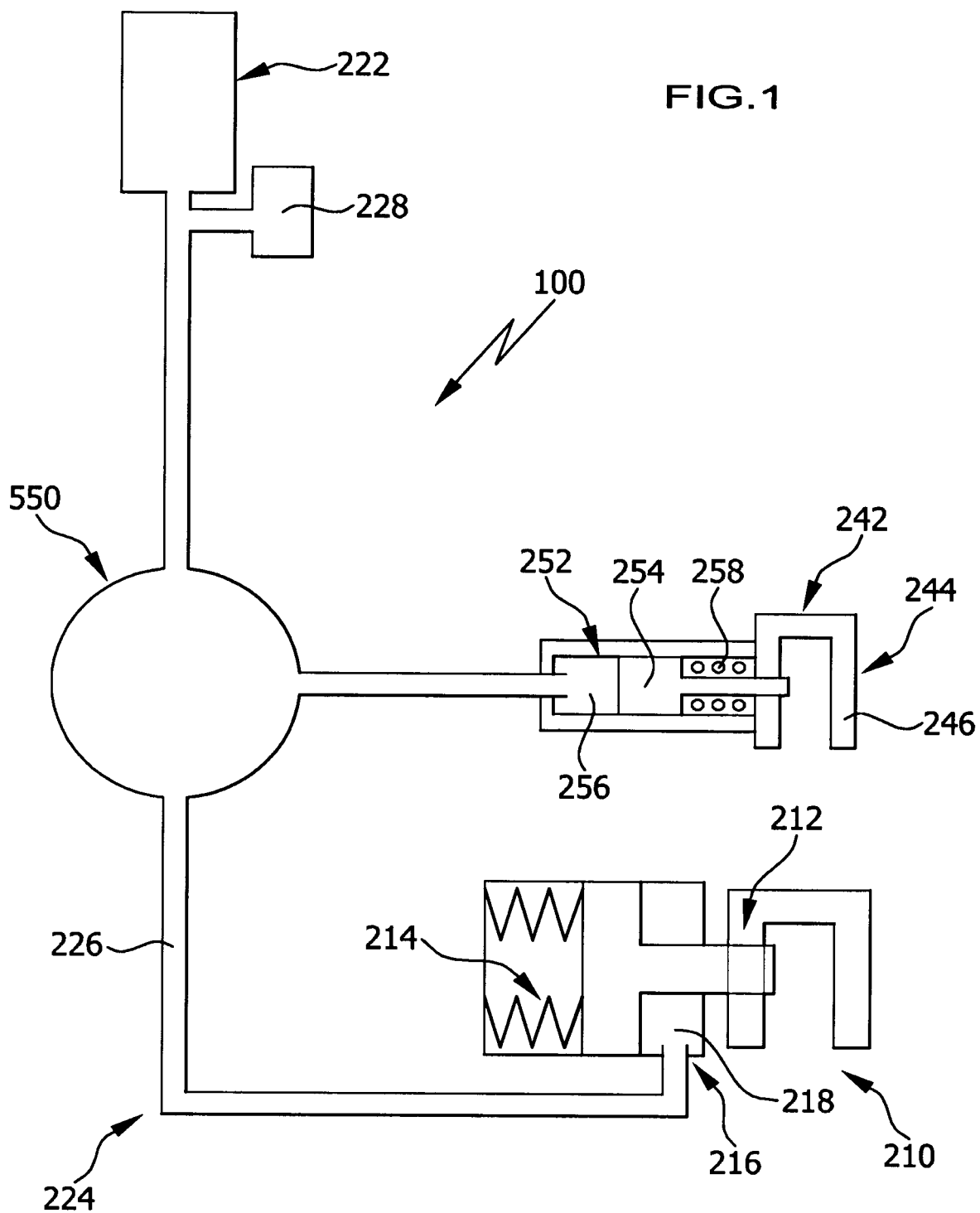
FIG. 1 shows a schematic illustration of a braking system of a first exemplary embodiment.

A first exemplary embodiment of a braking system, which is designated 100 as a whole, is usable with a vehicle 112 and is arranged thereon. The braking system 100 is illustrated schematically in FIG. 1 by way of example, and preferred configurations are illustrated in FIGS. 2 to 11.

Figure 2:
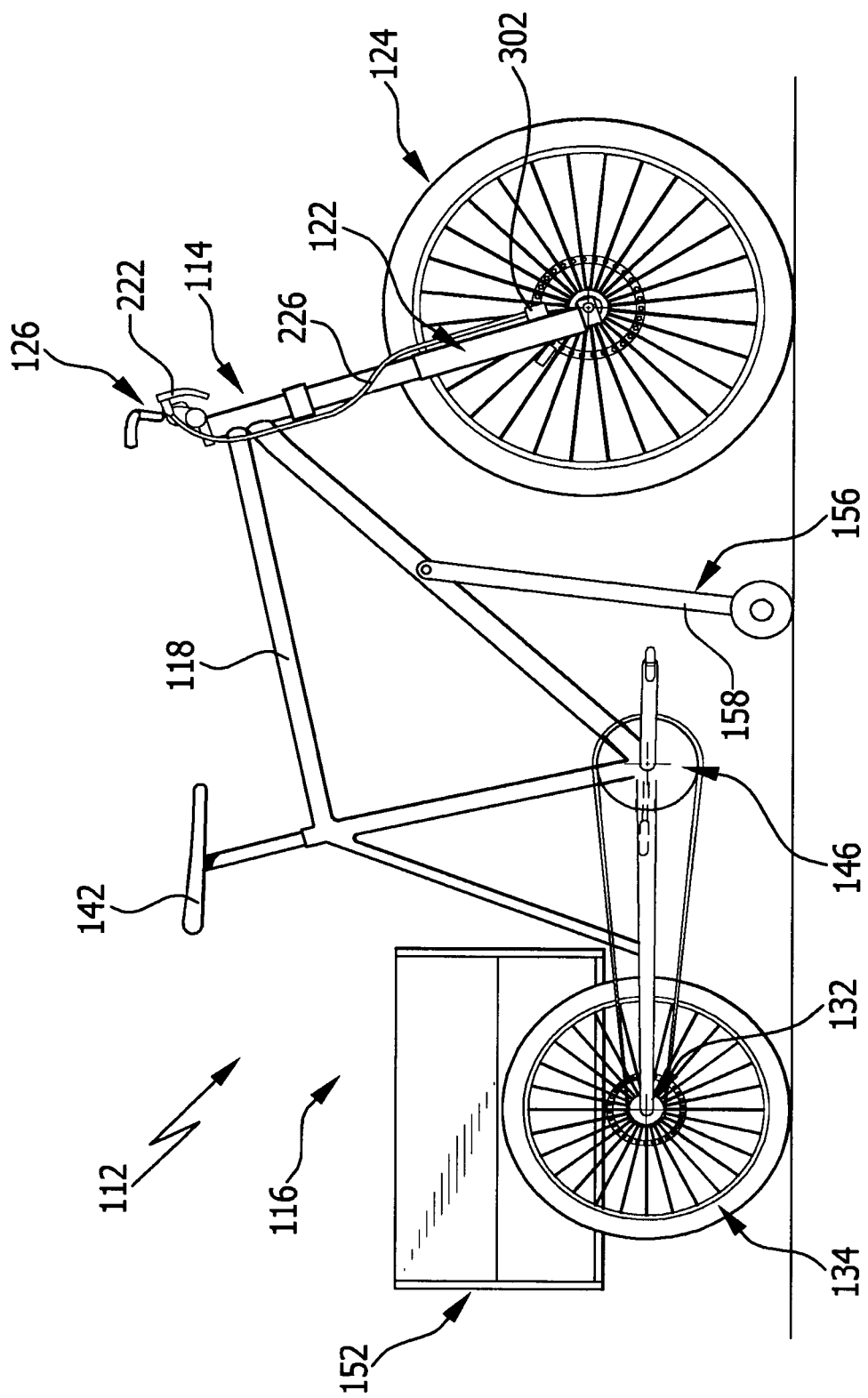
FIG. 2 shows an illustration of a carrier cycle, as an example of a lightweight vehicle having a braking system.
Figure 3:
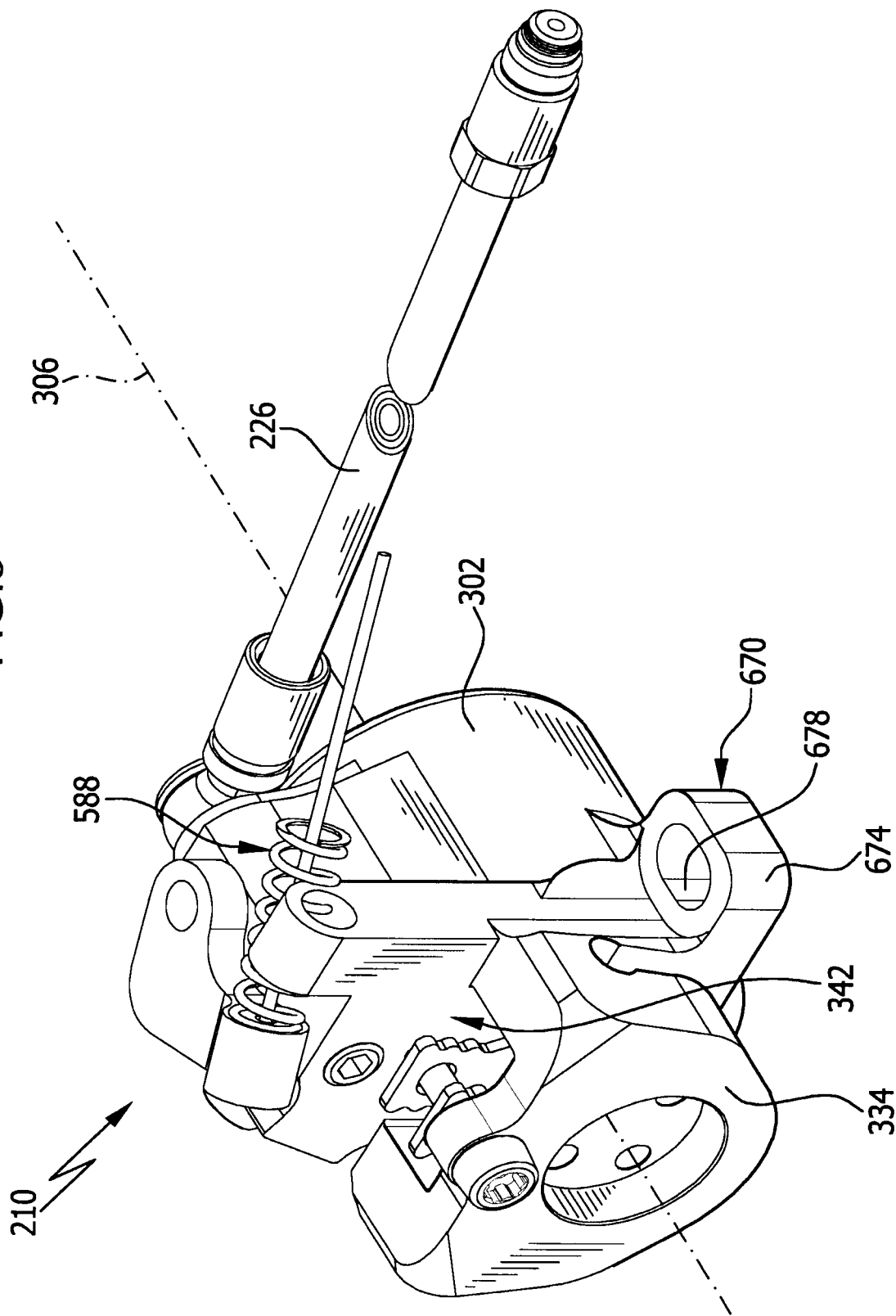
FIG. 3 shows a perspective illustration of a casing of a brake device of the braking system.
Figure 4:
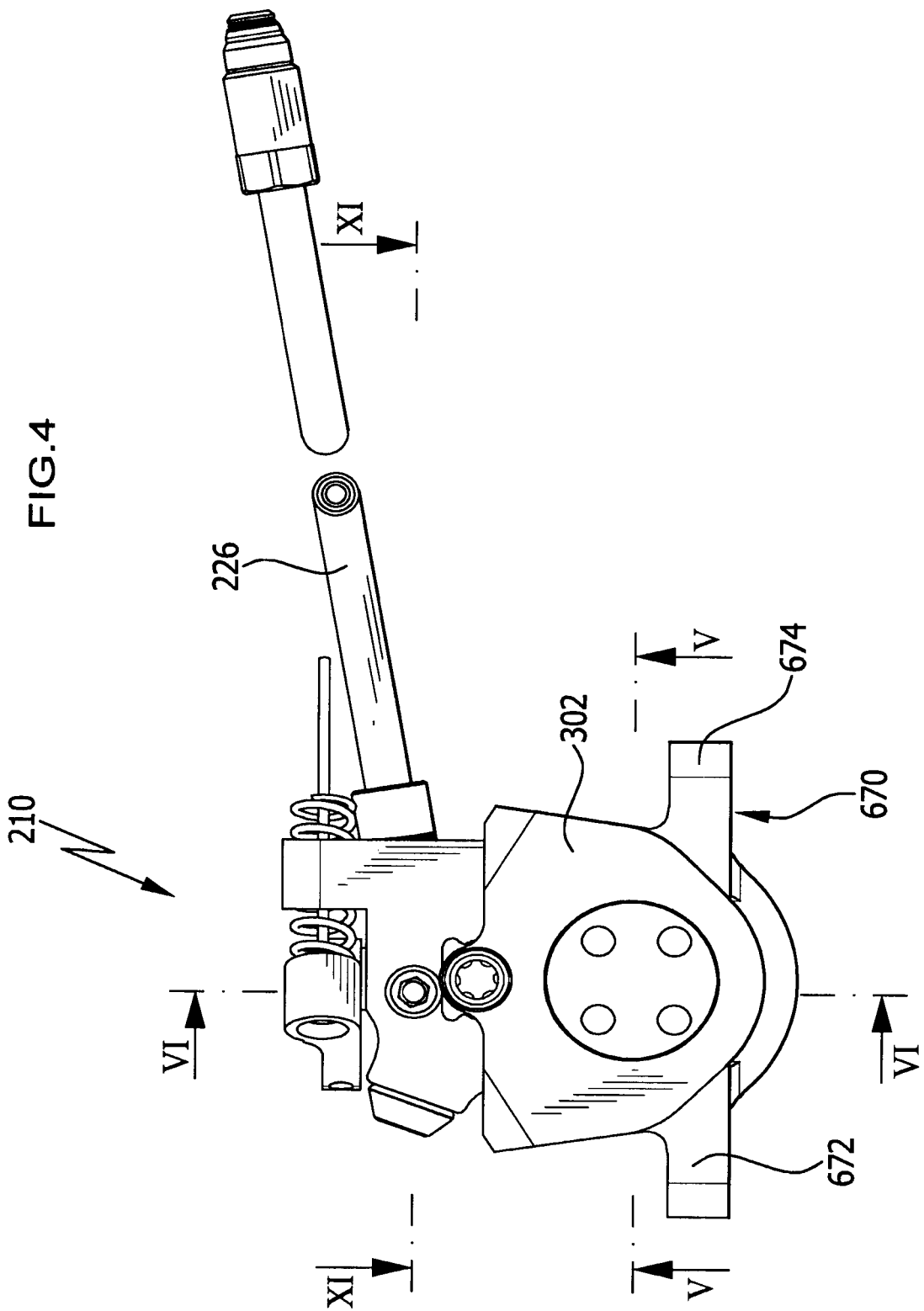
FIG. 4 shows a plan view of the casing, from the side.
Figure 5:
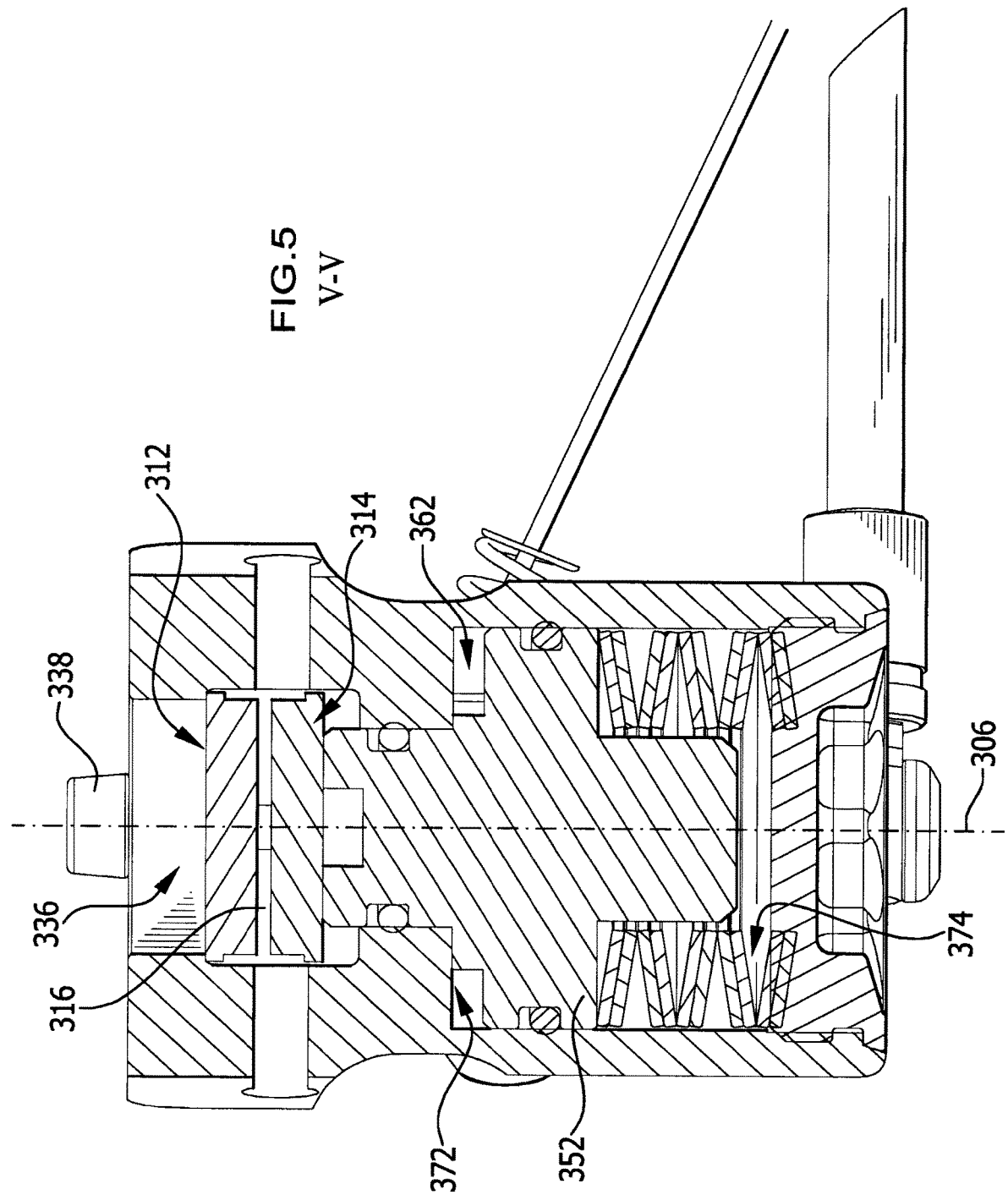
FIG. 5 shows a section V-V, as indicated in FIG. 4, through the casing.
Figure 6:
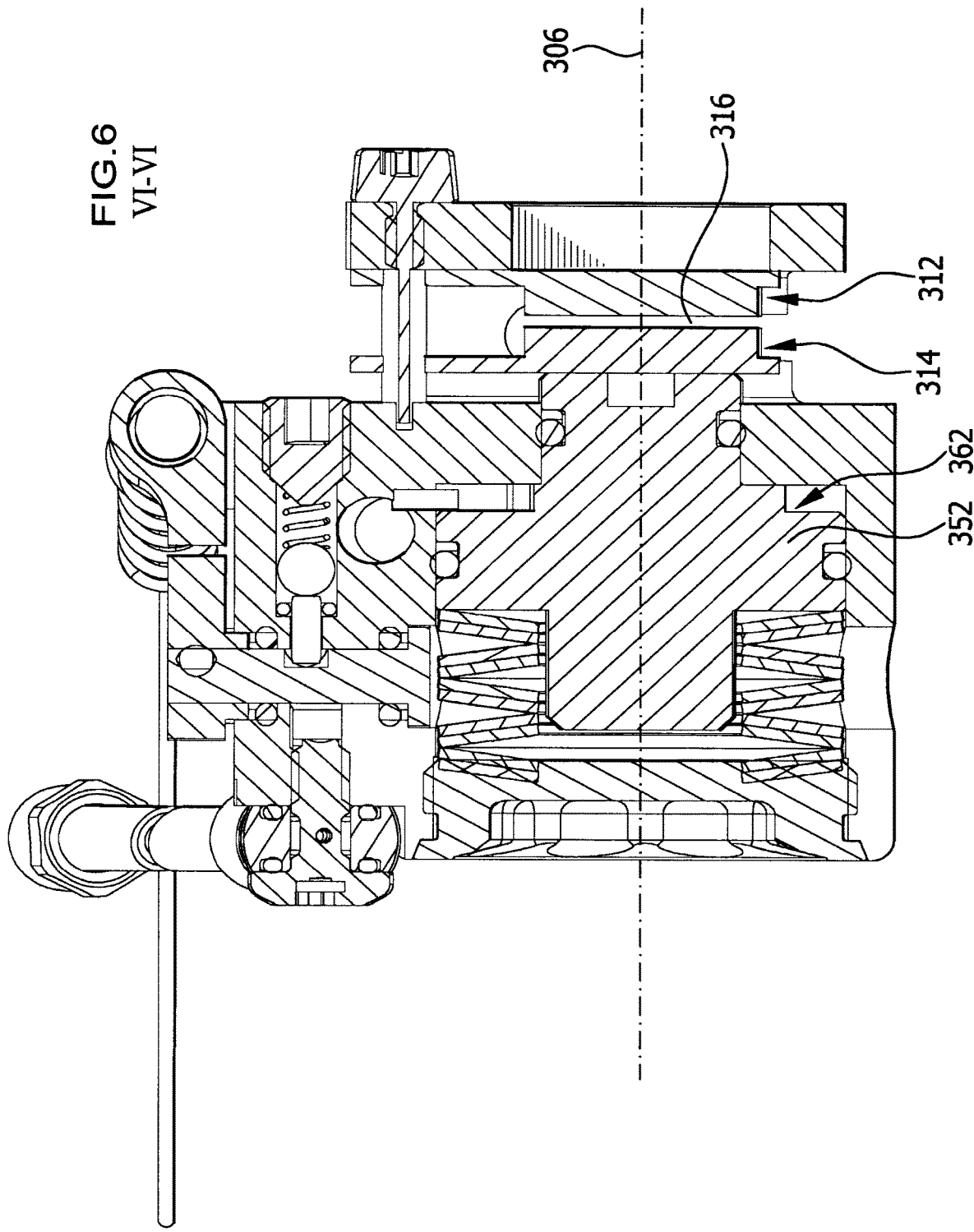
FIG. 6 shows a section VI-VI, as indicated in FIG. 4, through the casing.
Figure 7:
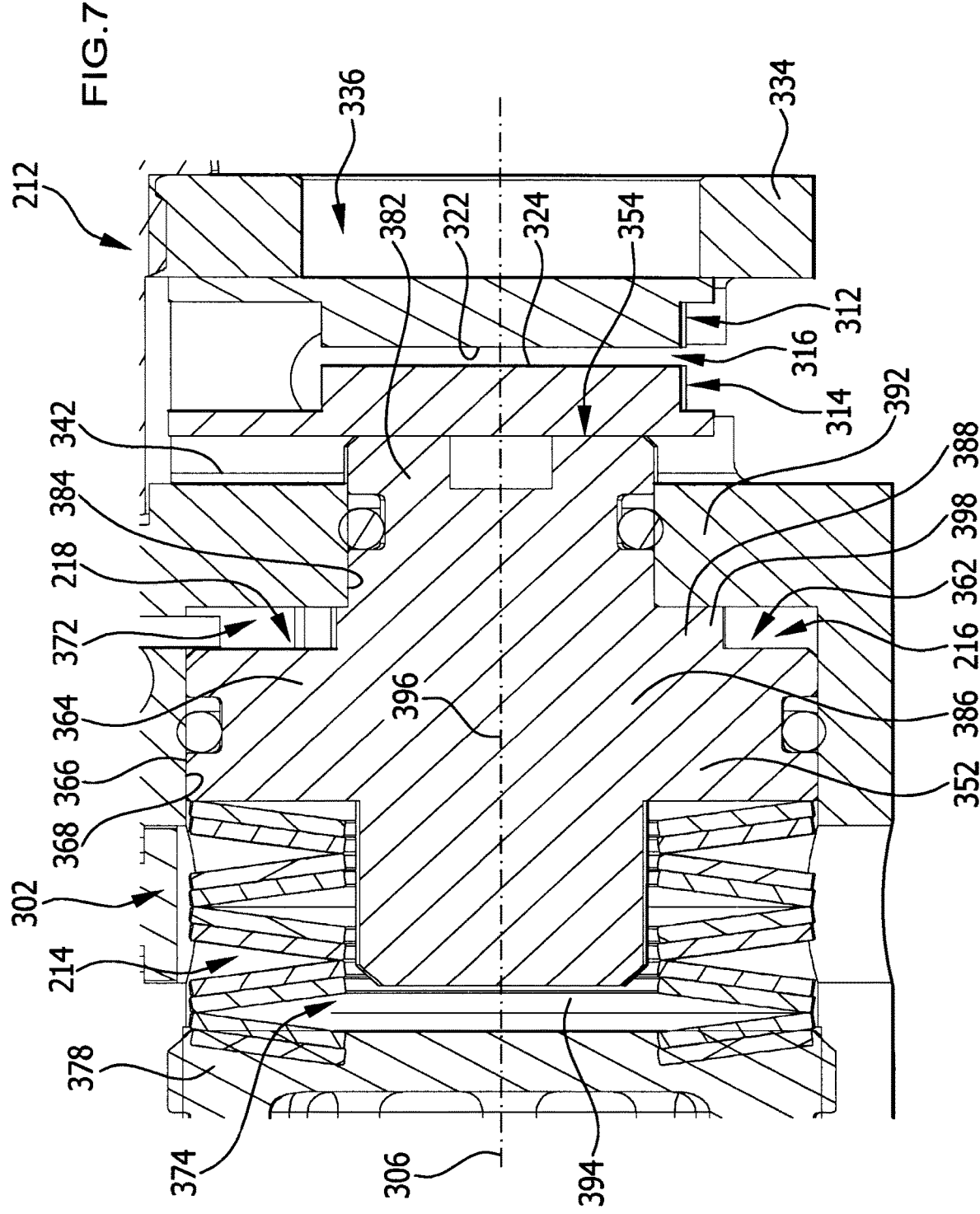
FIG. 7 shows an illustration on a larger scale of a detail according to FIG. 6, in the region of a brake device having brake shoe units and an urging piston.
Figure 8:
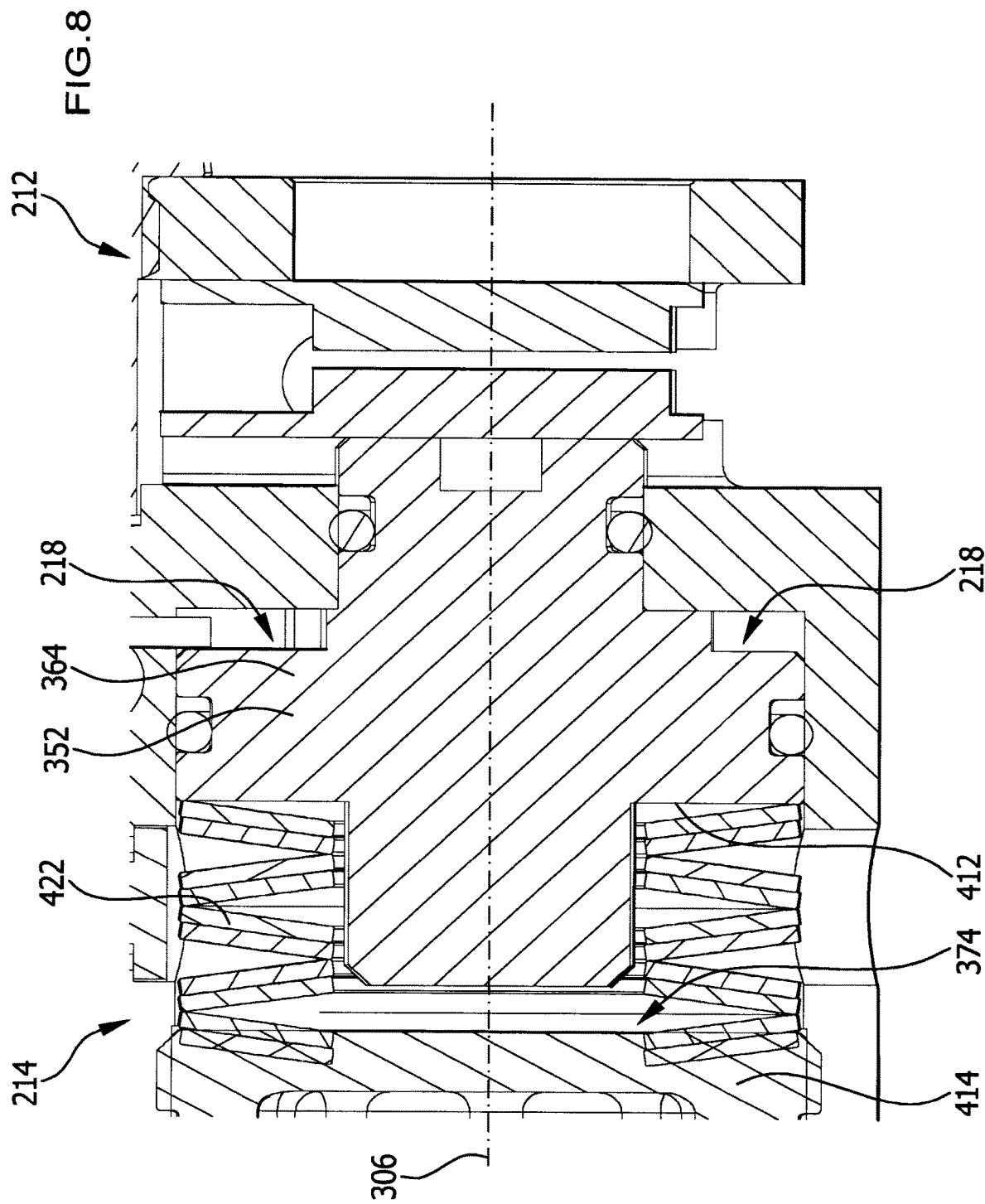
FIG. 8 shows an illustration substantially as in FIG. 7, substantially for the description of a mechanical urging device.
Figure 9:
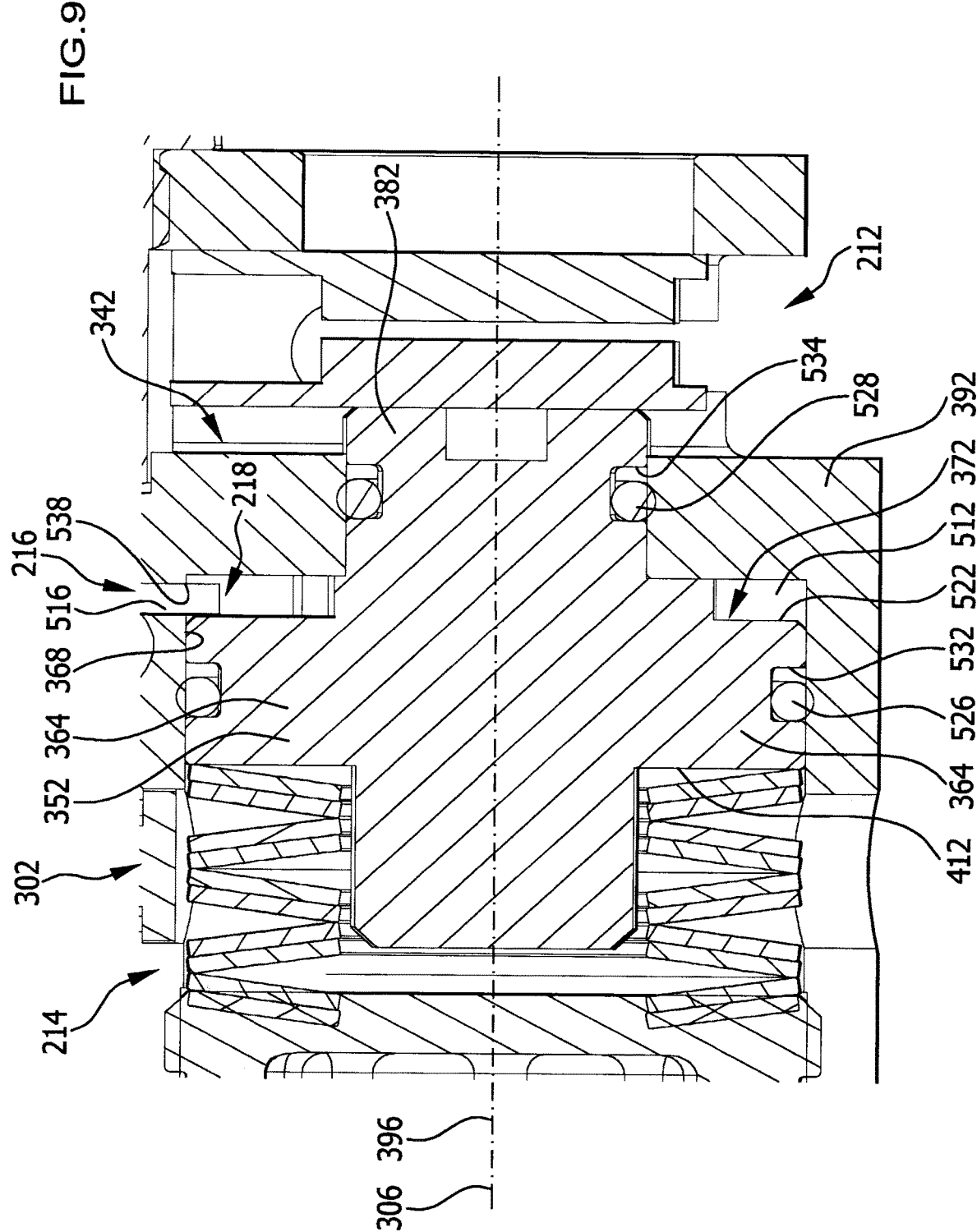
FIG. 9 shows an illustration substantially as in FIG. 7, substantially for the description of a hydraulic urging device.
Figure 10:
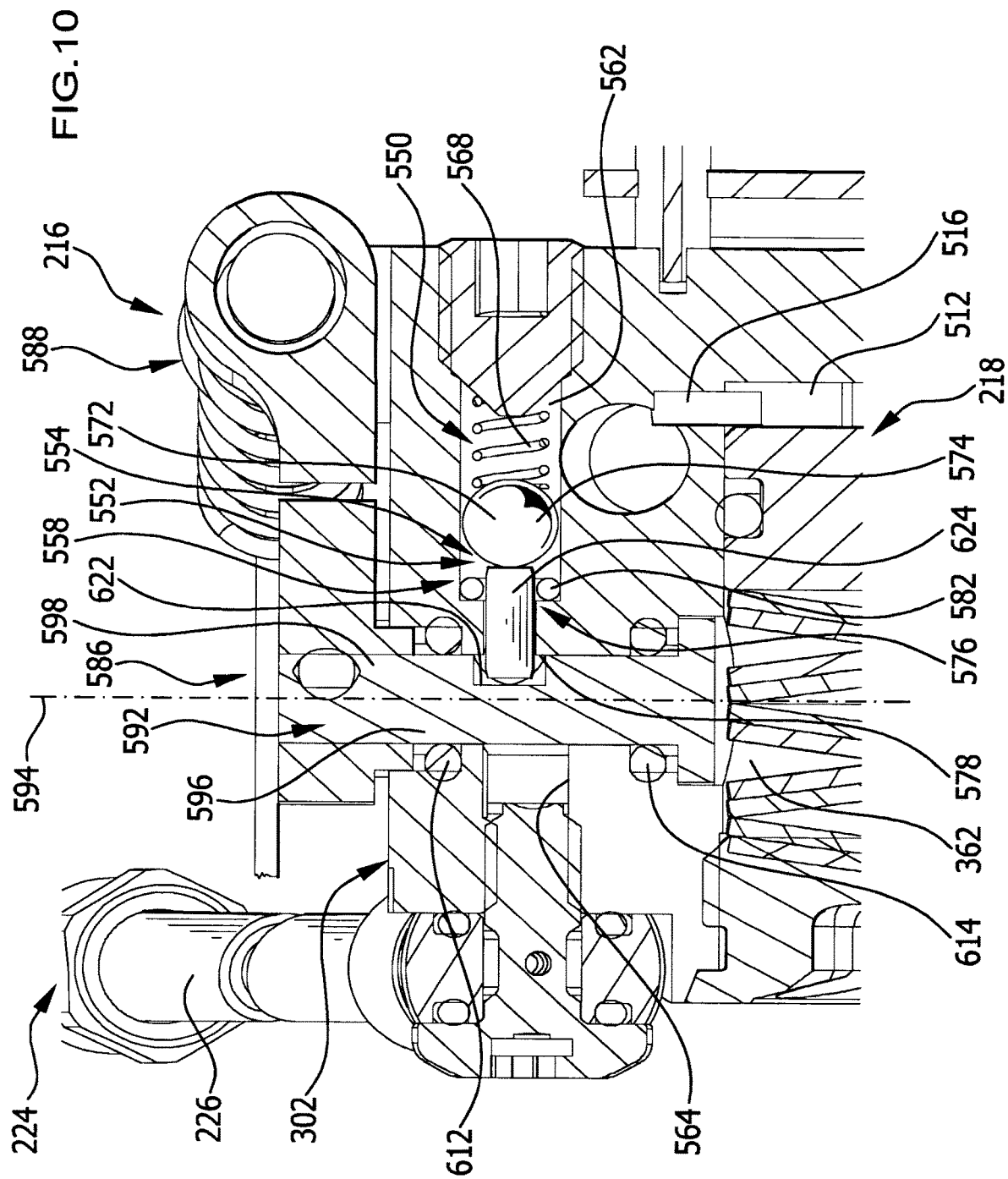
FIG. 10 shows an illustration on a larger scale of a detail according to FIG. 6, in the region of a valve control.
Figure 11:
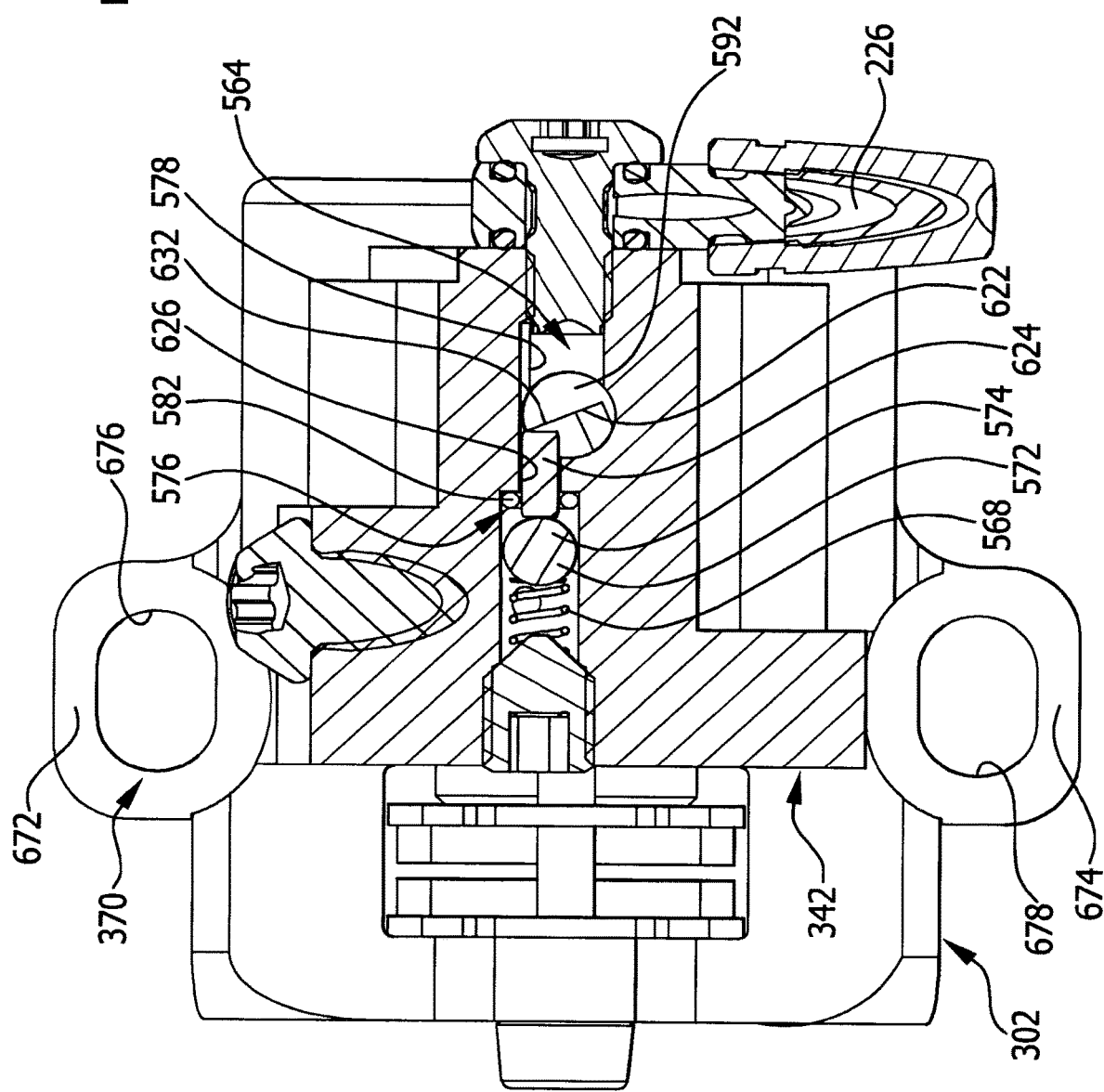
FIG. 11 shows a section XI-XI, as indicated in FIG. 4, through the casing.
Figure 12:
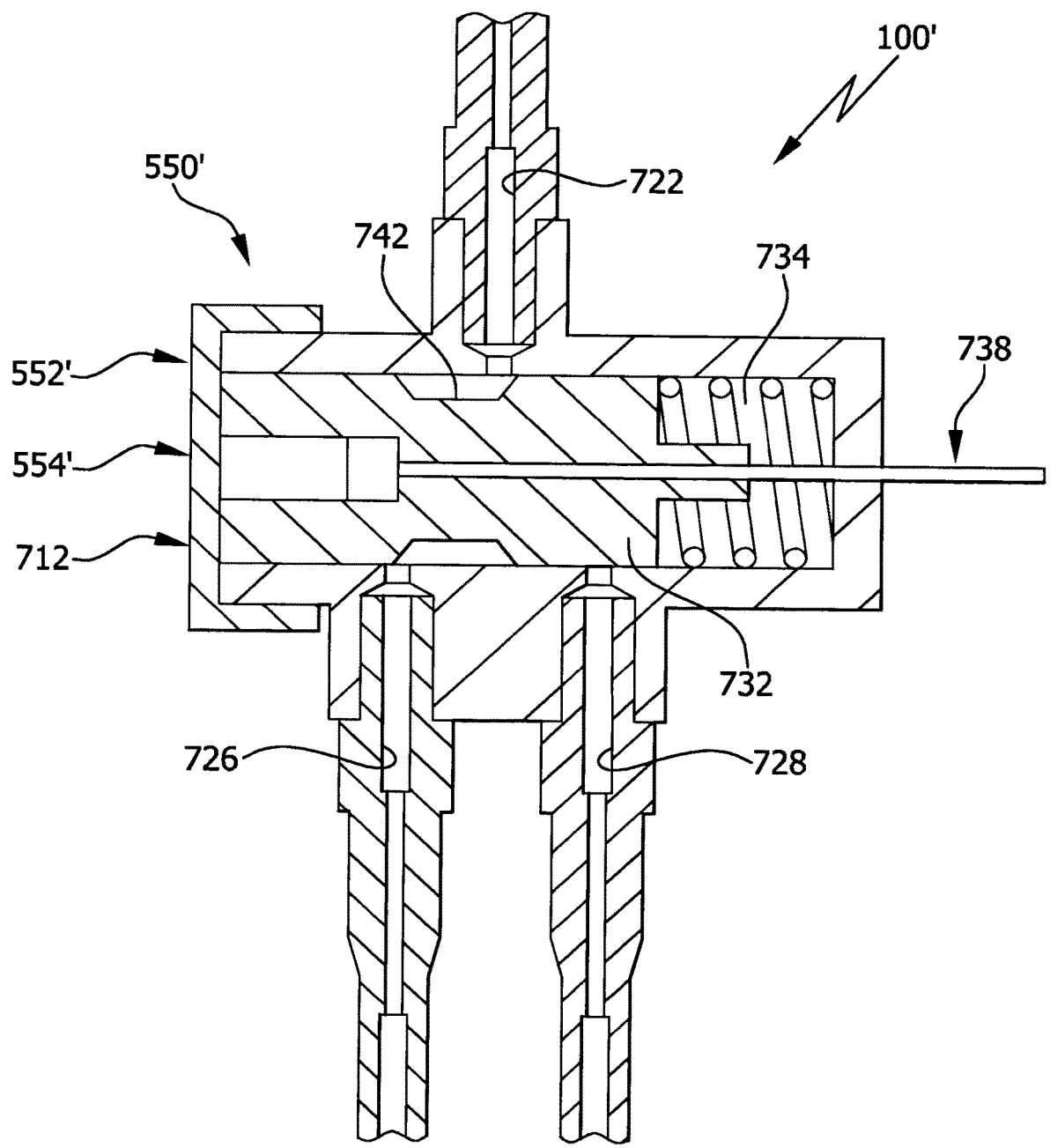
FIG. 12 shows a sectional illustration of a mechanical multiway valve according to a second exemplary embodiment.
Figure 13:
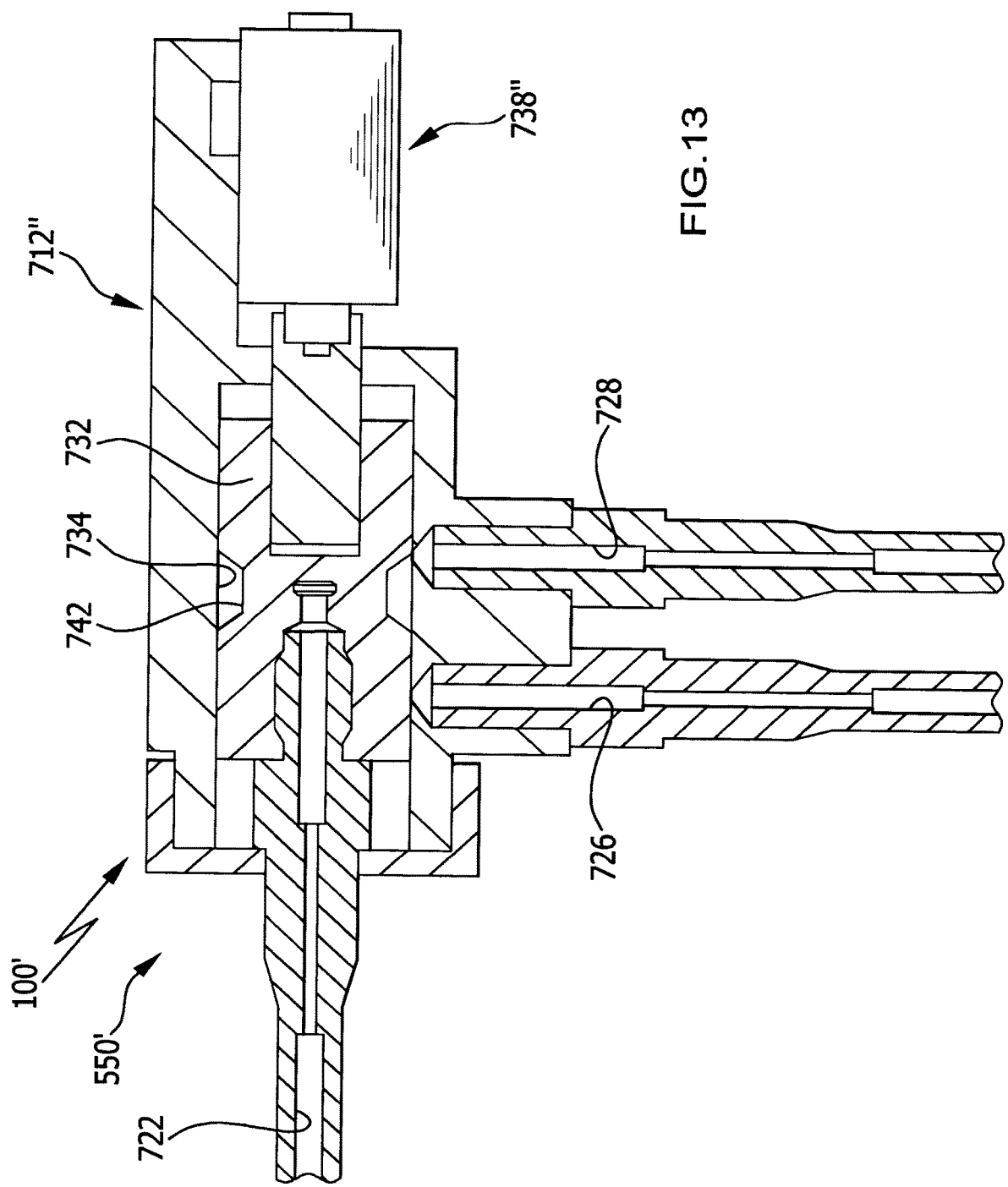
FIG. 13 shows a sectional illustration of an electrically actuable multiway valve according to a variant of the second exemplary embodiment.

The vehicle 112 is in particular a lightweight vehicle, in this exemplary embodiment a carrier cycle as an example of a pedal cycle, which is illustrated by way of example in FIG. 2. In variants of the exemplary embodiment, the vehicle is a conventional pedal cycle if it has no auxiliary drive, or if it has an auxiliary drive for example a pedelec or an e-bike. The braking system 100 is also usable in other, in particular handlebar-steered, lightweight vehicles.

The vehicle 112 comprises a frame 118 that extends from a front side 114 to a rear side 116 and takes the form in particular of a plurality of struts. The front side 114 and the rear side 116 here refer to a conventional direction of travel of the vehicle 112, so the front side 114 is at the front of the vehicle 112 and the rear side 116 at the rear during conventional forward travel of the vehicle 112.

At the front side 114, the frame 118 comprises a front wheel suspension 122 for in particular a front wheel 124 that is arranged on the front wheel suspension 122, mounted to be rotatable about an axis of rotation. Here, the axis of rotation extends at least approximately perpendicular to a direction of travel of the vehicle 112 during travel in a straight line. Further, the frame 118 comprises a handlebar 126, which is connected to the front wheel suspension 122, is mounted to be rotatable about a steering axis, and transmits a rotary movement through the front wheel suspension 122 to the front wheel 124 for the purpose of steering the vehicle 112. In particular, the steering axis is oriented at least approximately perpendicular to the axis of rotation of the front wheel 124.

At the rear side 116 there is provided a rear wheel suspension 132, on which for example two rear wheels 134, of which only one is visible in FIG. 2, are arranged, mounted to be rotatable about a rear axis of rotation. In variants of the exemplary embodiment, and for example in conventional pedal cycles, only one rear wheel 134 is provided. In particular, the rear axis of rotation is oriented at least approximately parallel to the front axis of rotation.

The wheels 124, 134 each comprise a hub and a rim, which are connected to one another, in particular by a multiplicity of spokes. A tire is drawn onto the rim. The wheels 124, 134 have a lightweight construction, corresponding to the lightweight vehicle. Thus, there is provided a small hub that substantially only forms a casing for a bearing of a wheel axis for rotation about the axis of rotation, and the spokes are in particular wire-like spokes that are sufficiently stable for the wheel of lightweight construction. For example, substantially perpendicular to their longitudinal extent from the hub to the rim, these spokes have a diameter of between 1 mm and 10 mm, for example between 1 mm and 5 mm.

In the case of a wheel 124, 134 of this kind, the hub has a small diameter transverse to the axis of rotation, such that a brake ring arranged on the wheel 124, 134 extends radially outside the hub and around it. In particular, a brake ring of this kind is arranged on the hub itself, since although the spokes take a form that is sufficiently stable for connecting the hub to the rim, they take too weak a form to be able to carry a brake ring as well. The brake ring is arranged directly on the hub, for example as part of a brake disk, or in the case of variants by means of webs or another securing device.

Moreover, the vehicle 112, in particular a pedal cycle, has a saddle that is arranged on the frame 118, for a person riding it.

Moreover, also provided for the vehicle 112 is a drive system, designated 146 as a whole, that comprises at least in particular a muscle-powered drive system. For example, the drive system 146 comprises pedals that are mounted to be rotatable, and a rotary movement thereof is transmitted to the rear wheels 134 or the rear wheel 134 by means of a transmission device, in particular a chain.

In variants of the vehicle 112, the drive system 146 comprises, in addition or as an alternative, a small motor of low output, in particular an electric motor, for driving the vehicle 112.

Further, in the case of the carrier cycle, a load-transporting device 152 is arranged on the frame 118 or formed thereby. For example, the load-transporting device 152 is a box or basket that embraces a load-receiving space, and in other variants the load-transporting device 152 comprises panniers for the loads. In this exemplary embodiment, the load-transporting device 152 is arranged at the rear side 116, in particular between the two rear wheels 134, wherein in the case of other lightweight carrier vehicles the load-transporting device 152 is arranged at the front side 114.

It is favorable, in particular in the case of two-wheel vehicles 112, if it also has a support device, designated 156 as a whole, which, in a supported position, supports the vehicle 112 so that it does not tip over. In particular, the support device 156 also has a travel position in which it does not touch the ground and does not impair travel of the vehicle 112. Preferably, the support device 156 is pivotal between the supported position and the travel position. In particular, the support device 156 comprises a support arm 158, which is arranged to pivot on the frame 118 and which, in the supported position, is supported on the ground on which the vehicle 112 is parked, and thus prevents the vehicle from tipping over. In some variants, the support device 156, in particular the end of the support arm 158 that is supported against the ground, is provided with one or two wheels.

The braking system 100 comprises a parking brake device 210 that is formed by a brake device 212 and a mechanical urging device 214, and comprises a hydraulic urging device 216 at least as part of a hydraulic release device 218.

In particular, the braking system 100 also comprises a master unit 222 of a hydraulic system, which is designated 224 as a whole and of which the hydraulic urging device 216 is also a part. The master unit 222 is constructed to supply the hydraulic urging device 216 with a pressurized hydraulic medium by way of the hydraulic system 224, and is constructed in particular also to receive hydraulic medium that is displaced from the hydraulic urging device 216. To this end, the master unit 222 and the hydraulic urging device 216 are connected to a hydraulic line 226. In particular, the hydraulic medium is a liquid hydraulic medium, in particular an oil or brake fluid.

In this exemplary embodiment, the master unit 222 takes the form of a hand-actuated master unit that, for the purpose of actuation, has a lever and is arranged on the handlebar 226. In variants, master units 222 that are actuated in another way, in particular a foot-actuated master unit, are used.

Preferably, the master unit 222 also has a compensation tank 228. The compensation tank 228 serves as a reservoir for the hydraulic medium, in order for example fluctuations in the volume of hydraulic medium that is utilized and thus present in different conditions in the hydraulic medium consuming devices that are connected to the master unit 222—in particular in the hydraulic urging device 216. Moreover, preferably the compensation tank 228 is provided as a reserve tank for hydraulic medium, in order to replace hydraulic medium that is lost at leaky points in the hydraulic system 224, or in order to compensate for wear to the brake pads or fluctuations in temperature.

Further, the braking system 100 preferably also comprises an operating brake 242, which is in particular a hydraulic operating brake and is connected to the hydraulic system 224 and hence to the master unit 222, for the purpose of supplying pressurized hydraulic medium. In this case, the operating brake 242 is provided in order to act to brake during travel with the vehicle 112—that is to say as the vehicle 112 moves along. The braking action in this case comprises in particular a reduction in speed to a lower speed, and also stopping movement of the vehicle 112—that is to say deceleration of the vehicle 112 from movement into a non-moving condition.

For this purpose, the operating brake 242 comprises an operating brake device 244, by means of which it is possible to act to brake a wheel 124, 134 of the vehicle 112. In particular, the wheel comprises a brake ring, which the operating brake device 244 acts to brake by means of brake shoes 246 having an urging effect, such that in this exemplary embodiment the operating brake 242 takes the form of a disk brake.

For the purpose of urging the operating brake device 244, the operating brake comprises an urging device, which is designated 252 as a whole and has an urging element 254 that, in an urging condition, urges the operating brake device 244 and triggers the braking action thereof. In particular, the urging device 252 of the operating brake 242 takes the form of a hydraulic urging device and is connected to the hydraulic system 224 and hence to the master unit 222. In this way, the operating brake 242 is supplied with pressurized hydraulic medium by the master unit 222, and in particular in a non-urging condition of the operating brake 242, hydraulic medium that is no longer needed can escape from the urging device 252 thereof by way of the hydraulic system 224.

In this arrangement, the urging element 254 is preferably a piston that is mounted to be movable in a casing of the operating brake 242. The hydraulic urging device 252 further comprises a hydraulic pressure chamber 256 that is at least partly delimited by the urging element 254 and is fluidically connected to the master unit 222.

When the master unit 222 is actuated, pressurized hydraulic medium reaches the hydraulic pressure chamber 256, and the urging element 254 is urged and put into a condition in which it urges the operating brake device 244. When actuation of the master unit 222 ends, the pressure therein is reduced, and the pressurized hydraulic medium in the hydraulic pressure chamber 256 escapes therefrom in the direction of the master unit 222. As a result, in particular with the support of a biasing element 258, the urging element 254 is put back into a home position thereof in which it does not urge the operating brake device 244, and thus the action of braking the operating brake 242 ends.

For example, the biasing element 258 is a spring element that urges the urging element 254, which in particular takes the form of a piston. In particular, it is provided for the biasing element 258 to be biased to urge the urging element 254 in the direction of its home position.

In this way, the operating brake 242 has a home position in which it does not act to brake the wheel 142, 134, and as long as there is actuation of the operating brake 242 it is put into a braking condition in which it acts to brake the wheel 124, 134.

The braking system 100 comprises in particular a casing 302 for the mechanical and the hydraulic urging devices 214, 216 and the brake device 212, wherein these are at least for the most part arranged in or on the casing.

In particular, there is defined in the casing 302 an axis of urging 306, along which in particular the brake device 212 and the mechanical urging device 214 and for example also the hydraulic urging device 216 are at least partly arranged.

The brake device 212 comprises two brake shoe units 312, 314, which define between them a brake receiving space 316. The two brake shoe units 312, 314 are arranged to be movable in relation to one another, with the result that the size of the brake receiving space 316 is variable as a result of moving the brake shoe units 312, 314 in relation to one another. In a braking condition of the brake device 212, the brake receiving space is smaller than in a release condition thereof.

In particular, it is provided, in the case of the vehicle 112 with the braking system 100, for the brake ring of one of the wheels 124, 134 to be arranged with a portion in the brake receiving space 316, and in the event of a rotary movement of the wheel to extend, rotating, through the brake receiving space 316. In the release condition, because of the relatively large brake receiving space 316 the rotary movement of the brake ring is unhindered, wherein in the braking condition, as a result of the reduced size of the brake receiving space 316, the brake shoe unit 312, 314 act to brake the brake ring, in particular urging it, and thus in particular substantially prevent a rotary movement of the brake ring and thus also of the wheel 134, 124.

On their sides facing the brake receiving space 316, the brake shoe units 312, 314 have brake pads for urging the brake ring into the braking condition. For example, the brake pads 322, 324 are held mechanically or magnetically.

Preferably, at least one of the brake shoe units, for example the brake shoe unit 312, has a wear compensation arrangement 332 by means of which, if the brake pad 322 of the brake shoe unit 312 wears, it can be re-adjusted in relation to the other brake shoe unit—in this case the brake shoe unit 314—and in this way the brake receiving space 316 has a defined size, in particular in the release condition and the braking condition—that is to say that in particular the brake pads 322, 324 are at a defined spacing in relation to one another in the corresponding conditions.

For this purpose, there is provided for example in the brake shoe unit 312 a holder 334, and the brake pad 322 is arranged on a shifting arrangement 336 such that it is movable in relation to the holder 334. The shifting arrangement 336 is arranged on the holder 334 such that it is shiftable and fixable in relation to the holder 334, and for this purpose comprises in particular an adjusting screw 338. Shifting is performed in particular along the axis of urging 306. In this way, the brake pad 322 of this brake shoe unit 112 can be adjusted and fixed in its position by means of the shifting arrangement 336, in particular along the axis of urging 306, with the result that in the event of wear to one of the brake pads it can be put back at a defined spacing from the other brake pad 324.

In particular, the brake shoe units 312, 314 are arranged on a brake side 342 of the casing, and are arranged on the casing for example on this brake side 342 and outside the casing. For this purpose, the holder 334 is arranged on the brake side 342 and engages above the other brake shoe unit 314, which is arranged abutting against the brake side 342. For example, the holder 334 is screwed to the casing 302 by screws.

Further, the brake device 212 comprises an urging piston 352 that, depending on the orientation of urging thereof, puts the brake device 212 into at least the one braking condition and the at least one release condition by moving the position of the brake shoe units 312, 314. To this end, the brake shoe unit 314 is coupled to the urging piston 352 to perform urging, wherein in this exemplary embodiment the brake pad 324 of this brake shoe unit 314 is arranged on a front side 354 of the urging piston 352, for example being held magnetically.

The casing 302 has a piston guide space 362 that extends in elongate form along the axis of urging 306 and takes the form for example of a bore 302. The urging piston 352 is arranged in the piston guide space 362, mounted to be movable linearly along the axis of urging 306.

For this purpose, the urging piston 352 comprises for example a guide part 364, of which external guide faces 366 are arranged such that they slidingly abut against piston guide faces 368 of the casing 302, which delimit the piston guide space 362.

The piston guide faces 368 extend in a direction that is axial in relation to the axis of urging 306, between two axial end regions 372, 374 of the piston guide space 362. In particular, one of the axial end regions, for example the end region 372, is arranged on the brake side 342, and the other axial end region 374 is arranged opposite, as seen in the direction axial in relation to the axis of urging 306, and the space between them forms the piston guide space 362.

Provided at the axial end region 374 that is arranged opposite the brake side 342 there is for example an opening in the casing 302, which is closed by a closing element 378.

In this way, the piston guide space 362 takes the form of a space that is cylindrical in form in relation to the axis of urging 306, and in which the outer faces that delimit it coaxially in relation to the axis of urging 306 at least partly form the piston guide faces 368, and preferably extend away from the axial end region 372 that is arranged on the brake side 342. In variants, the detailed implementation of a cylindrical piston guide space of this kind may also take a different form from that above.

For the purpose of urging the brake shoe unit 314, the urging piston 352 has an urging part 382, which in this exemplary embodiment has the front side 354 at which the brake shoe unit 314 is arranged in a manner performing urging. For this purpose, in particular an aperture 384 is provided in the brake side 342 of the casing 302, through which the urging part 382 passes, protruding from the piston guide space 362, and to the outwardly protruding region of which the brake shoe unit 314 is coupled, in particular being arranged thereon. Thus, in this case the front side 354 of the urging piston 352 is arranged outside the piston guide space 362.

The urging part 382 and the guide part 364 are connected to one another in particular by means of a connecting part 386 of the urging piston 352.

Further, the urging piston 352 has a front axial abutment 388, in particular on the connecting part 386. When the urging piston is urged in the direction of the braking condition, in a brake end position the front axial abutment 388 cooperates with a casing wall 392 of the casing 302, and any further movement of the urging piston 352 in this direction of urging is prevented. In particular, the casing wall 392 is the casing wall that delimits the axial end region 372 in the axial direction and that has the aperture 384.

Further, the urging piston 352 has a rear axial abutment 394. When there is urging in the direction of the release condition, in a release end position the rear axial abutment 394 cooperates with the casing 302, in particular in the axial end region 374 on the opposite side to the brake side 342, and any further movement of the urging piston 352 in this direction, in the direction of the release condition, is prevented. In this exemplary embodiment, the rear axial abutment 394 cooperates with the closing element 378, but in variants of the exemplary embodiment other parts of the casing 302, for example a casing wall that delimits the piston guide space 362, cooperate with the rear axial abutment 394.

In particular, the rear axial abutment 394 is arranged on an opposite side to the urging part 382 and the front side 354. Preferably, the part having the rear axial abutment 394 extends away from the guide part 364, for example as far as an axial end side of the urging piston 352 that forms the axial abutment 394.

Preferably, the urging piston 352 takes the form of a one-piece body, wherein the parts thereof—in particular the guide part 364, the urging part 382 and the connecting part 386—are individual axial portions of this one-piece body. Preferably in this case, the individual parts 364, 382, 386 extend radially by different amounts from a piston axis 396, which in particular substantially coincides with the axis of urging 306.

In this case, the radial extent of the urging part 382 is smaller than the radial extent of the guide part 364. In particular, the urging piston 352 has its greatest radial extent in the region of the piston guide faces 368. In particular, also provided in the connecting part 386 is an alteration in the radial extent of the urging piston 352, and the front axial abutment 388 takes the form of a step 398 on the piston.

The mechanical urging device 214 is arranged in relation to the brake device 212 such that the mechanical urging device 214 is arranged urging the brake device 212, in particular the urging piston 352, in the direction of the braking condition.

In this way, the mechanical urging device 214 urges the urging piston 352 in the direction of the brake end position, in a direction linear with respect to the axis of urging 306.

For this purpose, in this exemplary embodiment the mechanical urging device 214 is arranged in the piston guide space 362 such that it is biased.

The bias takes a form such that it puts the urging piston 352 in the brake end position provided that, until this brake end position is reached, there is no opposing force, for example from the hydraulic urging device 216 and/or a brake ring pressed between the brake shoe units 312, 314, acting on the urging piston 352 and preventing further movement of the urging piston 352.

The mechanical urging device 214 is supported at one end against a first urging face 412 of the urging piston 352, and at the other against a support element 414 of the casing 302. Preferably, the support element 414 is arranged in the opposite axial end region 374 to the brake side 342, and also delimits the piston guide space 362. In this exemplary embodiment, the support element 414 is the closing element 378, whereas in variants of the exemplary embodiment the support element 414 is formed by a casing wall.

The first urging face 412 extends substantially perpendicular to the piston axis 396 and the axis of urging 306, and is arranged on a side of the urging piston 352 facing away from the urging part 382, for example on the guide part 364. In particular, the urging piston 352 has in the region of the first urging face 412 an alteration in its radial extent, and the first urging face 412 is formed on the associated step.

In particular, the mechanical urging device 214 comprises a spring element 422 that is arranged biased in the axial end region 374 of the piston guide space 362, between the support element 414 and the first urging face 412.

For example, the spring element 422 is arranged radially outside a part of the urging piston 352, and thus embraces it, wherein in particular the part embraced by the spring element 422 is the part of the urging piston 352 that extends from the guide part 364 to the rear axial abutment 394.

Because the mechanical urging device 214 urges the brake device 212 in the direction of the braking condition, they form the parking brake device 210.

The hydraulic urging device 216 comprises a hydraulic pressure chamber 512 in the piston guide space 362, wherein the hydraulic pressure chamber 512 is at least partly delimited by the urging piston 352, is fluidically connected to a hydraulic connector 518 by way of fluid ducts 516 in the casing 302, and is fluidically connectable and/or connected to the hydraulic line 526 and the master unit 222 by way of the hydraulic connector 518.

In particular in the axial end region 372 on the brake side, the pressure chamber 512 extends between the casing wall 392 that delimits this, in a direction that is axial in relation to the axis of urging 306, as far as a second urging face 522 of the urging piston 352.

In this way, the pressure chamber 512 takes a form that is variable in size in respect of its volume, in particular taking a form that is variable in length in a direction that is axial in relation to the axis of urging 306, depending on a position of the urging piston 352. In this case, the hydraulic pressure chamber 512 occupies a smaller volume in the braking condition than in the release condition. In this exemplary embodiment, this is due to the fact that the urging piston 352 is arranged closer to the brake side 342 in the braking condition than in the release condition, and thus an axial extent of the pressure chamber 512 between the casing wall 392 and the second urging face 522 is smaller in the braking condition than in the release condition.

The second urging face 522 extends substantially perpendicular to the axis of urging 306, and is formed in the opposite direction to the first urging face 412. In particular, sides of the guide part 364 that face away from one another respectively form one of the first and second urging faces 412, 522.

The pressure chamber 512 extends along the urging piston 352, and at axial ends thereof there are arranged seals 526 and 528 between the urging piston 352 and the casing 302, for the purpose of sealing off the pressure chamber 512. In particular, for this purpose the urging piston 352 has grooves 532 and 534 that extend around the piston axis 396 in a closed loop, in each case on a respective outer side of the urging piston 352, and partly receive the seals 526 and 528. For example, the groove 534 extends in the peripheral direction around the urging part 382, and the seal 528 arranged therein provides a seal in the aperture 384, between the urging part 382 and the casing wall 392. Further, it is preferably provided for the groove 532 to extend peripherally around the guide part 364 and for the seal 526 arranged therein to provide a seal between the guide part 364 and the casing 312, in particular the piston guide faces 368.

As seals 526, 528 there are provided in particular sealing rings, for example O-rings or X-rings.

In the axial end region 372 on the brake side there is provided an orifice opening 538 in a fluid duct 516, opening out into the pressure chamber 512. In this case, the orifice opening 538 is arranged such that it opens out into the pressure chamber 512, still remaining open in the braking condition, when the volume of the hydraulic pressure chamber 512 is minimal, and in particular the urging piston 352 is arranged at a distance from the orifice opening 538 in the brake end position and does not close it off. In this exemplary embodiment, the orifice opening 538 is arranged on a radial outer face that delimits the piston guide space 362, between the piston guide face 368 and the axial end side of the piston guide space 362. In variants, it is provided for the orifice opening 538 on the axial end side of the piston guide space 362 to open out into the piston guide space 362.

For the purpose of controlling a flow of hydraulic medium, and for the purpose of forming the hydraulic urging device 216 for the hydraulic release device 218, these comprise, as part of the hydraulic system 224, a valve control that is designated 550 as a whole.

For this purpose, the valve control 550 comprises a supply valve 552 and release valve 554, which in this exemplary embodiment are together formed by a check valve, designated 558 as a whole. In variants of the exemplary embodiment, the supply valve 552 and the release valve 554 are formed as two separate valves.

The supply valve 552 has an open condition and a blocking condition, wherein in the open condition there is enabled a through-flow of hydraulic medium in an unblocking direction that is oriented from the master unit 222 to the hydraulic pressure chamber 512, and in the blocking condition no through-flow of hydraulic medium through the supply valve 552 is possible.

The release valve 554 has an unblocking condition and a closed condition, wherein in the unblocking condition the release valve 554 enables hydraulic medium to drain out of the hydraulic pressure chamber 512, and in the closed condition the release valve closes the pressure chamber 512 in fluid-tight manner, in opposition to hydraulic medium in the pressure chamber 512.

In this exemplary embodiment, the supply valve 552 and the release valve 554 are arranged in a valve chamber 562 of the casing 302, wherein the valve chamber 562 is fluidically connected on the one side to the hydraulic pressure chamber 512 by way of a fluid duct 516 and on another side of the valves 552, 554 is fluidically connected to the hydraulic connector 518 for example by way of a further fluid duct.

The check valve 558, which forms both the supply valve 552 and the release valve 554, comprises a valve spring 568 that urges a body, which forms both a valve body 572 of the supply valve 552 and also a closing body 574 of the release valve 554, in the direction of a valve seat 576.

The valve body 572 or closing body 574 is mounted in the valve chamber 562 to be linearly movable in the direction of the urging direction of the valve spring 568, and in this case takes the form of a spherical body.

In this exemplary embodiment, the valve seat 576 is arranged in the valve chamber 562, at a mouth of a connecting duct 578. The connecting duct 578, as a fluid duct, fluidically connects the valve chamber 562 to the hydraulic connector 518.

Provided at the valve seat 576 is a seal 582, which is pressurized by the valve body 572 and the closing body 574 in the blocking condition and the closed condition respectively, and against which the valve 552, 554, 558 abuts in fluid-tight manner.

In this case, the seal 582 takes a form such that it completely surrounds the mouth of the connecting duct 578.

In this case, in this exemplary embodiment, pressurization for the purpose of fluid-tight sealing is performed in part by the valve spring 568 and for the most part by a positive pressure of the hydraulic medium introduced in pressurized form in the pressure chamber 256 by comparison with a lower pressure of the hydraulic medium on the hydraulic connector side.

In particular, the strength of the valve spring 568 is such that it is weaker than a force on the valve body 572 that is exerted by hydraulic medium that is provided in pressurized form from the master unit 222. In this way, pressurized hydraulic medium that is provided from the master unit 222 can open the check valve 558 and put the supply valve 552 into the open condition, and in so doing supply pressurized hydraulic medium to the pressure chamber 512. When actuation of the master unit 222 ends, the pressure of the hydraulic medium in the hydraulic line 226 falls, and hence so does that of the hydraulic medium urging the valve 552, 554, 558 on the hydraulic connector side, and the pressurized hydraulic medium in the pressure chamber 512 automatically closes the valve 552, 554, 558 by way of the valve chamber 562 as a result of urging by the valve body 572/closing body 574.

For the purpose of opening the check valve 558—that is to say putting the release valve 554 into the unblocking condition—there is provided a release arrangement that is designated 586 as a whole and is in particular actuable mechanically, for example by means of a Bowden cable 588.

In a home position of the release arrangement 586, it does not substantially interact with the check valve 558 or release valve 554, whereas when the release arrangement 586 is actuated it is moved into an actuation position in which the release arrangement 586 acts on the valve 554, 558 and puts the release valve 554 into the unblocking condition.

Preferably, it is provided for the release arrangement 586 to be spring-loaded, and for the spring to urge the release arrangement 586 in the direction of the home position.

For this purpose, the release arrangement 586 comprises an activation element 592, which in this exemplary embodiment is formed in the manner of a camshaft. The undulating activation element 592 is mounted to be rotatable in the casing 302 about an activation axis 594, and is arranged with an activation portion 596 on the hydraulic connector side of the valve 554, 558, for example in the connecting duct 578. In particular, moreover, an action portion 598 of the activation element 592 projects out of the casing 302, and the Bowden cable 588 acts in particular thereon and, when it is actuated, causes the activation element 592 to perform a rotary movement about the activation axis 594. In particular in this case, only a small rotation of the activation element is provided for the purpose of actuation, for example rotation in an angular range of at most 30°, preferably at most 20° and for example rotation of at least 5°.

In particular, there is arranged between the activation portion 596 and the action portion 598 a seal 612 which, when the action portion 598 projects out of the connecting duct 578, closes the hydraulic system 224—that is to say in this case the connecting duct 578—in fluid-tight manner. Moreover, a bore in which the activation element 592 is arranged extends, in this exemplary embodiment, as far as the piston guide space 362, and between the connecting duct 578 and the piston guide space 362 there is arranged a further seal 614, which seals the hydraulic system 224 off from the piston guide space 362. In particular, the seals 612, 614 take the form of sealing rings, for example O-rings or X-rings.

In the activation portion 596, the activation element 592 has a receptacle 622 for a plunger 624. The plunger 624 is arranged in a valve leadthrough 626 that opens into the valve seat 576, wherein the activation element 592 is arranged, with its receptacle 622, on an opposite side of the valve leadthrough 626 to the valve seat 576. In particular, the valve leadthrough 622 is part of the connecting duct 578.

In the home position of the release arrangement 586, the plunger 624 does not project beyond the valve seat 576 on the pressure chamber side—that is to say it is arranged set back from the valve seat 576, with the result that an abutment of the valve body 572 or closing body 574 that has the effect of closing off in fluid-tight manner is not impaired by the plunger 624 in the home position. In this home position, the plunger 624 is received in the receptacle 622 by means of an end thereof on the receptacle side.

Abutting against the receptacle 622 the activation element 592 has a displacing portion 632, which, on rotation about the activation axis 594 for the purpose of actuating the release arrangement 586, is moved in the direction of the plunger 624 and acts on the end thereof on the receptacle side, specifically displacing it in the direction of the valve seat 576. As a result of this displacement action by the displacing portion 632, the plunger 624 is thus moved in the direction of the valve seat 576 and hence also in the direction of the valve body 572 or closing body 574, and on the pressure chamber side projects beyond the valve seat 576, by means of an opposite end to the receptacle 622, and thus moves the valve body 572 or closing body 574 out of the fluid-tight position and presses this body 572, 574 spatially away from the valve seat 576, with the result that the check valve 558 opens and the release valve 554 is put into the unblocking condition.

In particular, the receptacle 622 takes the form of a notch in the activation element 592, wherein the notch is delimited by the displacing portion 632 and, in the home position, faces the valve leadthrough 626. When rotated for the purpose of actuation, the notch that forms the receptacle 622 is rotated away from the valve leadthrough 626, and the displacing portion 632 is rotated into a position facing the valve leadthrough 626. In this way, the end of the plunger 624 on the receptacle side, which projects out of the valve leadthrough 626 on the receptacle side, can no longer be received in the receptacle 622, but is displaced by the displacing portion 632 in the direction of the valve seat 576 by the valve leadthrough 626.

When the release arrangement 586 is no longer actuated—that is to say in particular when the Bowden cable 588 is released—the activation element 592 is rotated back in the direction of the home position by the spring loading, with the result that the receptacle 622 again faces the valve leadthrough 626 and can receive the end of the plunger 624 on the receptacle side, and in this way the plunger 624 adopts its position set back from the valve seat 576 again. In particular, putting back the plunger 624 is supported by the valve body 572 or closing body 574, which is urged by force, wherein the body 572, 574 is urged by force toward the valve seat 576, for example by the valve spring and/or the pressurized hydraulic medium in the pressure chamber 512.

The casing 302 is configured to be arranged and is arranged on the vehicle 112 at one of the wheel suspensions 122, 132 thereof, in particular at a fork end thereof. In this case, the casing 302 is arranged such that the brake shoe units 312, 314 are arranged in relation to the brake ring of one of the wheels 124, 134 such that a portion of the brake ring extends through the brake receiving space 316, and in the release condition the brake shoe units 312, 314 are arranged at a spacing from the brake ring, enabling it to rotate freely, and in the braking condition the brake shoe units 312, 314 urge the brake ring in a manner performing braking and thus substantially prevent rotation of the brake ring and hence of the wheel 124, 134.

For the purpose of secure arrangement and precise orientation of the casing 302 in relation to the brake device 212, preferably an adjusting arrangement 670 is provided on the casing 302.

In particular, the adjusting arrangement 670 comprises two flange projections 672, 674, which are formed laterally on the casing 302 and extending away therefrom. Preferably, the flange projections 672, 674 are arranged on the brake side 342 or, directly adjoining it, on the casing 302.

The flange projections 672, 674 each comprise a slot 676 and 678. Thus, a securing device, in particular a screw, is configured to be guided through the respective slot 676, 678 for the purpose of securing the casing 302. When a casing 302 is arranged on the vehicle 112, the securing device passes through the respective slot 676, 678 and thus secures the casing 302 to the vehicle 112, in particular to one of the wheel suspensions 122, 132. As a result of the elongate form of the slots 676, 678, in a condition that is not yet completely secured the securing device is shiftable in a longitudinal direction in the respective slot 676, 678, and hence, during securing, the casing 302 can be secured to the vehicle 112 in a manner oriented precisely in relation to the brake ring.

To summarize, the braking system 100 that has the parking brake device 210, which is formed by the brake device 212 and the mechanical urging device 214, and the hydraulic urging device 216, which forms the hydraulic release device 218, functions in particular as follows.

The mechanical urging device 214 urges the urging piston 352 in the direction of the braking condition, in which the urging piston 352 urges the brake shoe units 312, 314, as a result of which the brake receiving space 316 becomes smaller and a portion of the brake ring arranged therein is clamped between the brake shoe units 312, 314 in a manner performing braking. In this arrangement, the mechanical urging device 214 is mounted such that it is biased, with the result that in the absence of opposing forces it puts the brake device 212 into the braking condition, and in this way the mechanical parking brake device 210 is formed. Here, the parking brake device 210 is provided in particular in order to prevent a vehicle 122 that is at a standstill from moving off, and as a result of mechanical urging by the urging device 214 the vehicle 112 is kept in this resting position in a particularly favorable and reliable manner.

Preferably in this case, for the purpose of urging it is provided for the mechanical urging device 214 to comprise the spring element 422, which is arranged in the piston guide space 362 of the casing 302 together with the urging piston 352. The urging piston 352 is mounted in the piston guide space 362 such that it is movable in a linear direction axially in relation to the axis of urging 306. The spring element 422 is supported at one end against the casing 302 and at the other against the first urging face 412 of the urging piston 352, and is arranged in an opposite axial end region 372 of the piston guide space 362 to the braking side 342.

In the braking condition, by means of an urging part 382 that is arranged on the opposite side to the spring element 422 in relation to the axis of urging 306, the urging piston 352 urges at least the brake shoe unit 314, with the result that this, together with the other brake shoe unit 312, can act to perform braking on the brake ring. In particular in this case, the urging part 382 projects through the aperture 384 and out of the piston guide space 362, and the brake pad 324 of the brake shoe unit 314 is arranged at the front side 354 of the urging part 382 such that, when the urging piston 352 is moved back into the release condition, the urging piston 352 also moves back the brake shoe unit 314, with its brake pad 324, and this makes the brake receiving space 316 larger, and in this way the brake ring is released for a free rotation that is substantially unhindered by the brake shoe units 312, 314.

The hydraulic urging device 216 comprises the hydraulic pressure chamber 512, which is delimited by the urging piston 352 and the casing 302 in a manner variable in size and is preferably formed in the axial end region 372 of the piston guide space 362 on the brake side. The hydraulic pressure chamber 512 is fluidically connected to the master unit 222 through the hydraulic connector 518 by way of fluid ducts 516, wherein the valve control 550 controls through-flow of the hydraulic medium. The orifice opening 538 of a fluid duct 516 opens out into the pressure chamber 512 even in the braking condition, when the volume of the pressure chamber 512 is the smallest possible, which the pressure chamber 512 adopts in the brake end position of the urging piston 352, freely into the pressure chamber 512.

When actuation of the master unit 222 causes pressurized hydraulic medium to be introduced through this into the pressure chamber 512, the pressurized hydraulic medium acts in opposition to the mechanical urging device, and the urging piston 352 is put into a release condition, as a result of which the brake shoe units 312, 314 coupled thereto are moved into the release condition of the brake device 212. During this, the pressurized hydraulic medium acts in particular on the second urging face 522 of the urging piston 352, wherein the second urging face 522 is formed on an opposite side of the urging piston 352 to the first urging face 412, in particular of the guide part 364 thereof, and wherein the two urging faces 412, 522 are oriented facing away from one another.

The valve control 550 comprises the supply valve 552, which in an open condition provides unblocking for the inflow of pressurized hydraulic medium from the master unit 222 into the pressure chamber 512, and in a blocking condition prevents any through-flow of hydraulic medium. Moreover, the valve control 550 has the release valve 554, which in a closed condition closes the pressure chamber 512 off in fluid-tight manner from hydraulic medium in the pressure chamber 512, and in an unblocking condition provides unblocking for hydraulic medium to drain out of the hydraulic pressure chamber. Thus, if the supply valve 552 is in its blocking condition and the release valve 554 is in its closed condition, the hydraulic pressure chamber 512 is closed off in fluid-tight manner, and pressurized hydraulic medium therein cannot escape. Thus, if there is enough hydraulic medium in the pressure chamber 512 to put the urging piston 352 into the release position and thus the brake device 212 into the release condition, the urging piston 352 remains in the release position and the brake device 212 remains in the release condition, and in this way the hydraulic urging device 216 takes the form of a hydraulic release device 218. If the release valve 554 is moved by the release arrangement 586 into its unblocking condition, it enables the pressurized hydraulic medium to drain out of the pressure chamber 512, and in particular this drainage is intensified by the fact that the mechanical urging device 214 is urged in the direction of the braking condition. In this way, when the release valve 554 is released, the hydraulic medium drains out of the pressure chamber 512, and the urging piston 352 is moved into the braking position and the brake device 210 is moved into the braking condition.

Preferably, it is provided for the supply valve 552 and the release valve 554 together to be formed by the check valve 558, wherein the check valve 558 is a spring-loaded releasable check valve. In particular, the fact that the supply valve 552 and the release valve 554 are formed together makes it possible to arrange them in the casing 302 in integrated manner, even given the small space available to the casing 302 in the case of the wheel 124, 134 of a lightweight vehicle 112.

Preferably, it is also provided for a hydraulically actuated operating brake device 244 to be connected to the hydraulic system 224 of the hydraulic urging device 216 having the master unit 222, wherein the flow of hydraulic medium is controlled by the valve control 550. This favorably has the effect that both the hydraulic operating brake device 244 and also the hydraulic urging device 216 can be actuated by means of the one master unit 222.

In a second exemplary embodiment of a brake system 100', those elements and features that take at least substantially the same form and/or fulfill at least the same underlying function as in the first exemplary embodiment are provided with the same reference numeral, and for a description thereof the reader is referred to the entire content of the statements relating to the first exemplary embodiment. In particular where a modified configuration of a feature or element is to be particularly indicated in the second exemplary embodiment, the corresponding reference numeral is provided with a prime, and unless explained otherwise below, a feature and element of this kind preferably takes a form substantially as in the first exemplary embodiment.

The braking system 100' similarly comprises a brake device 212 that, together with a mechanical urging device 214, forms a parking brake device 210, and comprises a hydraulic urging device 216 as a hydraulic release device 218.

In particular in this case, and similarly, an urging piston 352 that is mounted to be linearly movable in a piston guide space 362 of a casing 302 is provided for the purpose of urging the brake device 212, which is urged in opposing directions, by the mechanical urging device 214 on the one hand and the hydraulic urging device 216 on the other.

In this exemplary embodiment, however, it is provided for the valve control 550' to be formed substantially outside the casing 302, and in particular to comprise a multiway valve 712. In particular, in this case the multiway valve 712 fulfills the functions of a supply valve 552' and a release valve 554'. In variants of the exemplary embodiment, the supply valve and the release valve are separate valves, wherein both valves or one of these are/is arranged outside the casing 302. For example, in a further variant of the exemplary embodiment, it is provided for the supply valve and the release valve to be formed together by a check valve that is formed outside the casing 302.

The multiway valve 712 comprises a supply line 722 that is fluidically connectable and connected to a master unit 222. Moreover, the multiway valve 712 comprises two consumer lines 726, 728, which are connectable and connected to the consuming devices of the pressurized hydraulic medium— that is to say in this case to the hydraulic urging device 216 and a hydraulically actuated operating brake device 244. Thus, the multiway valve 712 in particular takes the form of a three-way valve.

Moreover, the multiway valve 712 comprises a valve body 732. The valve body 732 has a first and a second position. In the first position, the valve body 732 fluidically connects the supply line 722 to the first consumer line 726, and seals off the second consumer line 728. In the second position, the valve body 732 fluidically connects the supply line 722 to the second consumer line 728, and seals off the first consumer line 726.

For example, the valve body 732 is arranged to be guided linearly movably in a valve chamber 734. Preferably, the valve body 732 is in this case arranged to be spring-loaded, for example in the direction of the first position. Further, an actuating device 738 is provided, by means of which the valve body 732 can be moved out of the first position and into the second position, and in particular, as a result of urging, when actuation by the actuating device 738 ends the valve body is moved back into the first position. In this exemplary embodiment, the actuating device 738 is a mechanical actuating device, and for example the valve body 732 is coupled to a Bowden cable that, when it is actuated, pulls on the valve body 732 and thus, in opposition to the urging, moves it into the second position.

For example, the valve body 732 has a groove 742 that extends peripherally around it. In this case, the groove 742 and the mouth of the supply line 722 opening into the valve chamber 734 are arranged in relation to one another such that in both the first position and the second position the supply line 722 and the groove 742 are fluidically connected to one another. On the other side, the groove 742 is arranged such that in the first position it is fluidically connected to the mouth of the first consumer line 726 into the valve chamber 734, and in the second position the groove 742 is fluidically connected to a mouth of the second consumer line 728 into the valve chamber 734. On the other hand, in the first position the mouth of the second consumer line 728 is closed off by the valve body 732, and in the second position the mouth of the first consumer line 726 into the valve chamber 734 is closed off by the valve body 732.

In this way, the valve body 732 of the second exemplary embodiment substantially fulfills the functions of the valve body 572 and the closing body 574 of the first exemplary embodiment.

In particular, the hydraulic urging device 216—that is to say in particular the hydraulic pressure chamber 256—is fluidically connected to the second consumer line 728. In this way, in the first position the multiway valve 712 has the blocking condition of the supply valve 552' and the closed condition of the release valve 554', and in the second position it has the open condition of the supply valve 552' and the unblocking condition of the release valve 554'.

In a variant of this exemplary embodiment, the multiway valve 712' similarly comprises a supply line 722 and two consumer lines 726, 728, which depending on the position of a valve body 732 arranged in a valve chamber 734 are fluidically connected to or sealed off from the supply line 722.

In this variant, it is provided for an actuating device 738" of the multiway valve 712 to be electrically actuable and for example for an electrical actuator to move the valve body 732 to and fro between the positions.

Otherwise, this variant of the exemplary embodiment takes a form as explained above, so the reader is referred to the entire content of the statements above.

Otherwise, all the further elements and features of the second exemplary embodiment preferably take at least substantially the same form and/or fulfill a function that is at least basically the same as elements in the first exemplary embodiment, so for a description thereof the reader is referred to the entire content of the statements relating to the first exemplary embodiment.

The invention claimed is:

1. A braking system for a vehicle, comprising a brake device, a mechanical urging device, and a hydraulic urging device, wherein the mechanical urging device and the brake device form a parking brake device, and the hydraulic urging device takes the form of a hydraulically actuable release device for the parking brake device, wherein the hydraulic urging device comprises a valve control with a releasable check valve and the check valve allows a through-flow of hydraulic medium for releasing the parking brake device but blocks a back-flow of hydraulic medium unless the check valve is released by a release arrangement and by way of the back-flow through the released check valve the mechanical urging device is enabled to put the parking brake device into a braking condition.

2. The braking system as claimed in claim 1, characterized in that the mechanical urging device is formed and arranged in relation to the brake device such that urging by the mechanical urging device puts the brake device into a braking condition.

3. The braking system as claimed in claim 1, characterized in that the hydraulic urging device is formed and arranged in relation to the brake device such that urging by the hydraulic urging device puts the brake device into a release condition.

4. The braking system as claimed in claim 1, characterized in that at least one brake shoe unit is coupled to an urging piston to perform urging, wherein at least in the braking condition, at least one of the brake shoe units is urged by the urging piston.

5. The braking system as claimed in claim 1, characterized in that a brake pad of a brake shoe unit is arranged on an urging piston.

6. The braking system as claimed in claim 1, characterized in that an urging piston comprises a front axial abutment for a brake end position, and in that the urging piston comprises a rear axial abutment for a release end position.

7. The braking system as claimed in claim 1, characterized in that the brake device comprises a wear compensation arrangement for two brake shoe units.

8. The braking system as claimed in claim 1, characterized in that a spring element of the mechanical urging device is arranged in the piston guide space.

9. The braking system as claimed in claim 1, characterized in that the mechanical urging device is mounted such that it is biased to urge the brake device.

10. The braking system as claimed in claim 1, characterized in that a volume of a hydraulic pressure chamber is smaller in the braking condition than in the release condition.

11. The braking system as claimed in claim 1, characterized in that a hydraulic pressure chamber extends along a partial portion of an extent of an urging piston that is axial in relation to an axis of urging.

12. The braking system as claimed in claim 1, characterized in that an orifice opening in a fluid duct opens out into a hydraulic pressure chamber, into a minimal volume of the hydraulic pressure chamber that corresponds to the brake end position.

13. The braking system as claimed in claim 1, wherein the hydraulic urging device for the brake device comprises a hydraulic pressure chamber.

14. The braking system as claimed in claim 1, characterized in that the brake device comprises a casing, the casing comprises an adjusting arrangement, for the purpose of adjusting the brake device when it is mounted on a vehicle.

15. A vehicle comprising a braking system as claimed in claim 1.

16. A vehicle comprising a braking system as claimed in claim 13.

17. The braking system of claim 13, wherein the hydraulic medium in the hydraulic pressure chamber acts to release the parking device.

18. A braking system for a vehicle, having a hydraulic urging device for a brake device that comprises a hydraulic pressure chamber and a valve control, wherein the valve control comprises a releasable check valve as a release valve, which in an unblocking condition enables a through-flow of hydraulic medium from the hydraulic pressure chamber, and has a closed condition, in which the release valve blocks a back-flow of hydraulic medium from the hydraulic pressure chamber, and wherein, in an actuation position, a release arrangement moves the release valve into the unblocking condition, wherein the release arrangement is mechanically movable into the actuation position.

19. The braking system as claimed in claim 18, characterized in that the hydraulic urging device comprises a master unit for providing a pressurized hydraulic medium.

20. The braking system as claimed in claim 19, characterized in that the master unit comprises a compensation tank having a reservoir for hydraulic medium.

21. The braking system as claimed in claim 18, characterized in that the valve control comprises a supply valve, which in an open condition enables a through-flow of hydraulic medium in an unblocking direction that is oriented from a hydraulic connector, to which a master unit is connected and/or connectable, to the hydraulic pressure chamber, wherein the supply valve has a blocking condition in which no through-flow of hydraulic medium through the supply valve is possible.

22. The braking system as claimed in claim 21, characterized in that a valve body is arranged on a pressure chamber side of a valve seat of the supply valve.

23. The braking system as claimed in claim 22, characterized in that the valve seat has a sealing ring, for the purpose of receiving the valve body in its blocking position, which the valve body adopts in the blocking condition of the supply valve.

24. The braking system as claimed in claim 21, characterized in that the supply valve is a spring-loaded valve.

25. The braking system as claimed in claim 21, characterized in that the supply valve is a hydraulically actuated valve, wherein the supply valve is put into its open condition by pressurized hydraulic medium that is provided by way of the hydraulic connector.

26. The braking system as claimed in claim 18, characterized in that the release valve is a spring-loaded valve, wherein the release valve comprises a closing body which adopts a closed position in the closed condition, wherein the closing body is spring-loaded in the direction of the closed position.

27. The braking system as claimed in claim 18, wherein the release arrangement is mechanically movable into the actuation position by means of a Bowden cable.

28. The braking system as claimed in claim 27, characterized in that the release arrangement is spring-loaded, wherein the release arrangement is moved out of the actuation position by the spring loading.

29. The braking system as claimed in claim 27, characterized in that the release arrangement comprises an activation element by means of which, in the actuation position, the release valve is moved into the unblocking condition.

30. The braking system as claimed in claim 27, characterized in that a home position and the actuation position of the release arrangement correspond to different angular positions of an activation element in relation to an activation axis, and wherein a rotation of the activation element about the activation axis brings about transfer from the home position to the actuation position.

31. The braking system as claimed in claim 27, characterized in that the release arrangement comprises a plunger and an activation element, which has a displacing portion, wherein the displacing portion acts on the plunger when there is a transfer from a home position to the actuation position.

32. The braking system as claimed in claim 31, characterized in that the plunger passes through a valve leadthrough of valve seat of the release valve, at least in the actuation position.

33. The braking system as claimed in claim 18, characterized in that a supply valve and the release valve take the form of a single valve in the form of the releasable check valve.

34. The braking system as claimed in claim 18, characterized in that the valve control is at least partly integrated in a casing.

35. The braking system as claimed in claim 18, characterized in that an activation element of the release arrangement is at least substantially arranged in a casing, and is arranged to be at least partly rotatable about an activation axis in relation to the casing.

36. The braking system as claimed in claim 35, characterized in that the activation element is arranged at least partly in a fluid duct that is formed by the casing, and the connecting duct, which fluidically connects a valve chamber to the fluid duct that has the activation element, forms a valve leadthrough of a valve of the valve control.

37. The braking system as claimed in claim 18, further comprising an operating brake which, by means of the valve control, is connectable to a master unit and/or is fluidically connected to the master unit.

38. A vehicle comprising a braking system as claimed in claim 18.

* * * * *